United States Patent
Park et al.

(10) Patent No.: US 10,253,804 B2
(45) Date of Patent: Apr. 9, 2019

(54) HINGED DEVICE

(71) Applicant: Microsoft Technology Licensing, LLC, Redmond, WA (US)

(72) Inventors: Daniel C. Park, Woodinville, WA (US); Errol M. Tazbaz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/414,432

(22) Filed: Jan. 24, 2017

(65) Prior Publication Data
US 2018/0209473 A1    Jul. 26, 2018

(51) Int. Cl.
| | |
|---|---|
| *E05D 11/06* | (2006.01) |
| *F16C 11/04* | (2006.01) |
| *E05D 11/10* | (2006.01) |
| *E05D 3/06* | (2006.01) |

(Continued)

(52) U.S. Cl.
CPC ............. *F16C 11/04* (2013.01); *E05D 3/06* (2013.01); *E05D 11/105* (2013.01); *G06F 1/1601* (2013.01); *G06F 1/1618* (2013.01); *G06F 1/1679* (2013.01); *G06F 1/1681* (2013.01);

(Continued)

(58) Field of Classification Search
CPC ........ G06F 1/168; G06F 1/1681; G06F 1/116; G06F 1/1601; E05Y 2900/602; E05Y 2900/606; H04M 1/002; E05D 3/06; E05D 3/12; E05D 3/122; E05D 11/06; E05D 11/1014; E05D 11/1007; E05D 11/105; E05D 11/1028; E05D 11/1064; Y10T 16/547; Y10T 16/5474; Y10T 16/5475;

(Continued)

(56) References Cited

U.S. PATENT DOCUMENTS

| | | | |
|---|---|---|---|
| 2,040,279 | A | 5/1936 | Soss |
| 3,289,877 | A | 12/1966 | Wolf |
| 4,493,316 | A | 1/1985 | Reed |

(Continued)

FOREIGN PATENT DOCUMENTS

| | | |
|---|---|---|
| CN | 1180516 A | 12/2004 |
| CN | 103291737 A | 9/2013 |

(Continued)

OTHER PUBLICATIONS

"360 deg Hinge Video," published Jul. 21, 2013, retrieved at <<https://www.youtube.com/watch?v=lhEczMi4nsw>> on Aug. 17, 2016, 1 page.

(Continued)

*Primary Examiner* — Chuck Y Mah

(74) *Attorney, Agent, or Firm* — Rainier Patents, P.S.

(57) ABSTRACT

The description relates to hinged devices, such as hinged computing devices. One example can include a first portion and a second portion. The example can also include a determinative hinge assembly rotatably securing hinge ends of the first and second portions around a first hinge axis associated with the first portion and a second hinge axis associated with the second portion. The determinative hinge assembly includes a detent-priority sub-assembly that controls an order of rotation around the first and second axes with a first detent associated with the first hinge axis that has a different depth than a second detent associated with the second hinge axis.

20 Claims, 19 Drawing Sheets

(51) Int. Cl.
*G06F 1/16* (2006.01)
*H04M 1/02* (2006.01)

(52) U.S. Cl.
CPC ....... *H04M 1/022* (2013.01); *E05Y 2900/606* (2013.01)

(58) Field of Classification Search
CPC ............ Y10T 16/541; Y10T 16/54028; Y10T 16/54038; Y10T 16/5478; Y10T 16/551
See application file for complete search history.

(56) References Cited

U.S. PATENT DOCUMENTS

| | | | |
|---|---|---|---|
| 4,617,699 A | 10/1986 | Nakamura | |
| 4,718,127 A * | 1/1988 | Rittmann | A42L 33/223 |
| | | | 16/326 |
| 4,753,331 A | 6/1988 | Dietenberger et al. | |
| 4,845,809 A | 7/1989 | Pillifant, Jr. | |
| 4,949,427 A | 8/1990 | Keller | |
| 4,976,007 A | 12/1990 | Lam | |
| 4,986,763 A | 1/1991 | Boyle | |
| 4,996,739 A | 3/1991 | Baer | |
| 5,041,818 A | 8/1991 | Liu | |
| 5,173,686 A | 12/1992 | Fujihara | |
| 5,229,921 A | 7/1993 | Bohmer | |
| 5,448,799 A | 9/1995 | Stein, Jr. | |
| 5,509,590 A | 4/1996 | Medeiros et al. | |
| 5,566,048 A | 10/1996 | Esterberg | |
| 5,606,774 A | 3/1997 | Wu | |
| 5,640,690 A | 6/1997 | Kudma | |
| 5,666,694 A | 9/1997 | Slow et al. | |
| 5,796,576 A | 8/1998 | Kim | |
| 5,987,704 A | 11/1999 | Tan | |
| 5,995,373 A | 11/1999 | Nagai | |
| 6,108,868 A | 8/2000 | Lin | |
| 6,223,393 B1 | 5/2001 | Knopf | |
| 6,301,489 B1 | 10/2001 | Winstead | |
| 6,416,027 B1 | 7/2002 | Hart | |
| 6,421,235 B2 | 7/2002 | Ditzik | |
| 6,577,496 B1 | 6/2003 | Gioscia et al. | |
| 6,628,244 B1 | 9/2003 | Hirosawa | |
| 6,766,561 B1 | 7/2004 | Cheng | |
| 6,778,381 B1 | 8/2004 | Bolognia et al. | |
| 6,813,143 B2 | 11/2004 | Makela | |
| 6,925,684 B2 | 8/2005 | Kang | |
| 7,058,433 B2 | 6/2006 | Carpenter | |
| 7,127,776 B2 | 10/2006 | Park | |
| 7,155,266 B2 | 12/2006 | Stefansen | |
| 7,266,864 B2 * | 9/2007 | Kim | H04M 1/0212 |
| | | | 16/367 |
| 7,293,380 B2 | 11/2007 | Repecki | |
| 7,328,481 B2 | 2/2008 | Barnett | |
| 7,345,872 B2 | 3/2008 | Wang | |
| 7,380,312 B2 | 6/2008 | Ge et al. | |
| 7,407,202 B2 | 8/2008 | Ye et al. | |
| 7,414,834 B2 | 8/2008 | Ukonaho et al. | |
| 7,418,766 B2 | 9/2008 | Nelson et al. | |
| 7,436,674 B2 | 10/2008 | Barsun et al. | |
| 7,515,406 B2 | 4/2009 | Kee | |
| 7,515,707 B2 | 4/2009 | Ka et al. | |
| 7,584,524 B2 | 9/2009 | Hung | |
| 7,596,358 B2 | 9/2009 | Takagi | |
| 7,596,395 B2 | 9/2009 | Gartrell | |
| 7,636,985 B2 | 12/2009 | Greenbank | |
| 7,753,331 B2 | 7/2010 | Tang | |
| 7,758,082 B2 | 7/2010 | Weigel et al. | |
| 7,832,056 B2 | 11/2010 | Kuwajima et al. | |
| 7,900,323 B2 | 3/2011 | Lin | |
| 7,936,559 B2 | 5/2011 | Chen | |
| 7,966,694 B2 | 6/2011 | Estlander | |
| 7,966,698 B2 | 6/2011 | Barnett | |
| 8,032,988 B2 | 10/2011 | Lai et al. | |
| 8,050,021 B2 | 11/2011 | Grady et al. | |
| 8,122,970 B2 | 2/2012 | Palen | |
| 8,170,630 B2 | 5/2012 | Murayama et al. | |
| 8,405,978 B2 | 3/2013 | Okutsu | |
| 8,441,791 B2 | 5/2013 | Bohn et al. | |
| 8,451,601 B2 | 5/2013 | Bohn et al. | |
| 8,474,101 B2 | 7/2013 | Wang et al. | |
| 8,498,100 B1 | 7/2013 | Whit | |
| 8,522,401 B2 | 9/2013 | Jin | |
| 8,578,561 B2 | 11/2013 | Chuang | |
| 8,615,848 B2 * | 12/2013 | Mitsui | H04M 1/022 |
| | | | 16/354 |
| 8,624,844 B2 | 1/2014 | Behar et al. | |
| 8,638,546 B2 | 1/2014 | Hoshino | |
| 8,649,166 B2 | 2/2014 | Wu et al. | |
| 8,665,382 B1 | 3/2014 | Sugimoto et al. | |
| 8,687,354 B2 | 4/2014 | Uchiyama et al. | |
| 8,713,759 B2 | 5/2014 | Cai | |
| 8,776,319 B1 * | 7/2014 | Chang | G06F 1/1681 |
| | | | 16/303 |
| 8,780,570 B2 * | 7/2014 | Bohn | H04M 1/022 |
| | | | 361/679.28 |
| 8,787,016 B2 | 7/2014 | Rothkopf et al. | |
| 8,804,324 B2 | 8/2014 | Bohn et al. | |
| 8,826,495 B2 | 9/2014 | Jauvtis et al. | |
| 8,833,554 B2 | 9/2014 | Busri | |
| 8,854,834 B2 | 10/2014 | O'Connor et al. | |
| 8,855,726 B2 | 10/2014 | Ozawa | |
| 8,875,349 B2 | 11/2014 | Hanigan | |
| 8,908,364 B2 | 12/2014 | Tseng et al. | |
| 8,908,365 B2 | 12/2014 | Walters et al. | |
| 8,923,934 B2 | 12/2014 | Chol et al. | |
| 8,938,856 B1 | 1/2015 | Shin et al. | |
| 8,959,714 B2 | 2/2015 | Hsu | |
| 8,971,029 B2 | 3/2015 | Wong et al. | |
| 8,978,206 B2 | 3/2015 | Hsu et al. | |
| 8,982,542 B2 * | 3/2015 | Bohn | G06F 1/1681 |
| | | | 361/679.06 |
| 8,988,876 B2 | 3/2015 | Corbin | |
| 9,003,607 B1 | 4/2015 | Hsu | |
| 9,009,919 B1 | 4/2015 | Chiang | |
| 9,013,867 B2 | 4/2015 | Becze | |
| 9,014,381 B2 * | 4/2015 | Quan | H04R 3/007 |
| | | | 324/762.09 |
| 9,069,531 B2 | 6/2015 | Bohn et al. | |
| 9,103,147 B1 | 8/2015 | Chuang | |
| 9,104,381 B2 | 8/2015 | Kuramochi | |
| 9,122,455 B2 | 9/2015 | Meyers | |
| 9,185,815 B2 | 11/2015 | Hsu | |
| 9,201,464 B2 | 12/2015 | Uchiyama et al. | |
| 9,243,432 B2 | 1/2016 | Lee | |
| 9,290,976 B1 | 3/2016 | Horng | |
| 9,310,850 B2 | 4/2016 | Hsu | |
| 9,317,243 B2 | 4/2016 | Becze | |
| 9,348,450 B1 | 5/2016 | Kim | |
| 9,371,676 B2 | 6/2016 | Rittenhouse | |
| 9,411,365 B1 | 8/2016 | Tanner | |
| 9,417,663 B2 | 8/2016 | Kinoshita et al. | |
| 9,430,000 B2 | 8/2016 | Hood, III et al. | |
| 9,500,013 B2 | 11/2016 | Senatori | |
| 9,507,388 B1 | 11/2016 | Hampton et al. | |
| 9,523,226 B1 | 12/2016 | Lam et al. | |
| 9,524,000 B2 | 12/2016 | Hsu et al. | |
| 9,569,002 B2 | 2/2017 | Walker | |
| 9,600,036 B2 | 3/2017 | Uchiyama et al. | |
| 9,624,703 B1 * | 4/2017 | Lin | E05D 3/06 |
| 9,625,947 B2 | 4/2017 | Lee et al. | |
| 9,625,953 B2 | 4/2017 | Bitz et al. | |
| 9,625,954 B2 | 4/2017 | Campbell et al. | |
| 9,684,343 B2 | 6/2017 | Tazbaz | |
| 9,714,533 B2 | 7/2017 | Kuramochi | |
| 2002/0147026 A1 | 10/2002 | Hsieh | |
| 2003/0179880 A1 | 9/2003 | Pan et al. | |
| 2004/0091101 A1 | 5/2004 | Park | |
| 2004/0212956 A1 | 10/2004 | Kuivas et al. | |
| 2004/0226138 A1 | 11/2004 | Harmon et al. | |
| 2004/0266239 A1 | 12/2004 | Kurokawa | |
| 2005/0018393 A1 | 1/2005 | Kuo | |
| 2005/0122671 A1 | 6/2005 | Homer | |
| 2005/0148375 A1 | 7/2005 | DeLine | |
| 2005/0155182 A1 | 7/2005 | Han et al. | |
| 2005/0239520 A1 | 10/2005 | Stefansen | |

(56) References Cited

U.S. PATENT DOCUMENTS

| | | |
|---|---|---|
| 2006/0005356 A1 | 1/2006 | Amano et al. |
| 2006/0007648 A1 | 1/2006 | Wang |
| 2006/0046792 A1 | 3/2006 | Hassemer et al. |
| 2006/0059659 A1 | 3/2006 | Kim |
| 2006/0133052 A1 | 6/2006 | Harmon et al. |
| 2006/0179612 A1 | 8/2006 | Oshima et al. |
| 2007/0101541 A1 | 5/2007 | Yin et al. |
| 2007/0117600 A1 | 5/2007 | Robertson et al. |
| 2008/0112113 A1 | 5/2008 | Sawadski et al. |
| 2008/0174089 A1 | 7/2008 | Ekberg |
| 2008/0184530 A1 | 8/2008 | Chao |
| 2008/0239672 A1 | 10/2008 | Ghoshal |
| 2008/0250604 A1 | 10/2008 | Chen et al. |
| 2009/0070961 A1 | 3/2009 | Chung et al. |
| 2009/0104949 A1 | 4/2009 | Sato et al. |
| 2009/0291719 A1 | 11/2009 | Christensen |
| 2010/0205777 A1 | 8/2010 | Kim |
| 2010/0207844 A1 | 8/2010 | Manning |
| 2010/0232100 A1 | 9/2010 | Fukuma et al. |
| 2010/0328250 A1 | 12/2010 | Gorsica et al. |
| 2011/0099756 A1 | 5/2011 | Chen |
| 2011/0115713 A1 | 5/2011 | Altman |
| 2011/0128216 A1 | 6/2011 | Renwick |
| 2011/0177850 A1 | 7/2011 | Griffin et al. |
| 2011/0205695 A1 | 8/2011 | Hessemer et al. |
| 2011/0292605 A1 | 12/2011 | Chen et al. |
| 2012/0002360 A1 | 1/2012 | Seo et al. |
| 2012/0037047 A1 | 2/2012 | Moldovan |
| 2012/0046076 A1* | 2/2012 | Masser .............. G06F 1/1616 455/566 |
| 2012/0120618 A1 | 5/2012 | Bohn |
| 2012/0120627 A1 | 5/2012 | O'Connor et al. |
| 2012/0127471 A1 | 5/2012 | Urushidani |
| 2012/0137471 A1* | 6/2012 | Kujala ................ G06F 1/1681 16/382 |
| 2012/0162866 A1 | 6/2012 | Bohn et al. |
| 2012/0170243 A1 | 7/2012 | Griffin et al. |
| 2012/0206864 A1 | 8/2012 | Bohn et al. |
| 2012/0206893 A1 | 8/2012 | Bohn et al. |
| 2012/0257368 A1* | 10/2012 | Bohn .................... H04M 1/022 361/809 |
| 2012/0307472 A1 | 12/2012 | Bohn et al. |
| 2012/0314399 A1 | 12/2012 | Bohn |
| 2012/0314400 A1 | 12/2012 | Bohn et al. |
| 2013/0010405 A1 | 1/2013 | Rothkopf et al. |
| 2013/0016489 A1 | 1/2013 | Yeh et al. |
| 2013/0016492 A1 | 1/2013 | Wang et al. |
| 2013/0046492 A1 | 2/2013 | Westergaard |
| 2013/0111704 A1 | 5/2013 | Mitsui |
| 2013/0135809 A1 | 5/2013 | Uchiyama et al. |
| 2013/0139355 A1 | 6/2013 | Lee |
| 2013/0152342 A1 | 6/2013 | Ahn |
| 2013/0318746 A1 | 12/2013 | Kuramochi |
| 2013/0322004 A1 | 12/2013 | Park |
| 2013/0342094 A1 | 12/2013 | Walters et al. |
| 2014/0042293 A1 | 2/2014 | Mok et al. |
| 2014/0126133 A1 | 5/2014 | Griffin et al. |
| 2014/0129739 A1 | 5/2014 | King |
| 2014/0174227 A1 | 6/2014 | Hsu et al. |
| 2014/0185215 A1 | 7/2014 | Whitt et al. |
| 2014/0185220 A1 | 7/2014 | Whitt et al. |
| 2014/0196253 A1 | 7/2014 | Song et al. |
| 2014/0217875 A1 | 8/2014 | Park et al. |
| 2014/0246354 A1 | 9/2014 | Probst et al. |
| 2014/0265295 A1 | 9/2014 | Rhyner et al. |
| 2014/0287804 A1 | 9/2014 | Bohn et al. |
| 2014/0290008 A1 | 10/2014 | Hsu |
| 2014/0290009 A1 | 10/2014 | Kasai et al. |
| 2014/0293534 A1 | 10/2014 | Siddiqui |
| 2014/0360296 A1 | 12/2014 | Hsu |
| 2014/0362507 A1 | 12/2014 | Kinoshita et al. |
| 2014/0373338 A1* | 12/2014 | O'Connor ............ G06F 1/1641 29/592.1 |
| 2015/0016040 A1 | 1/2015 | Hood, III et al. |
| 2015/0020351 A1 | 1/2015 | Lin |
| 2015/0092337 A1* | 4/2015 | Tan ...................... H05K 5/0008 361/679.31 |
| 2015/0153787 A1 | 6/2015 | Mok et al. |
| 2015/0154437 A1 | 6/2015 | Aoki et al. |
| 2015/0176317 A1 | 6/2015 | Lee |
| 2015/0184437 A1 | 7/2015 | Wikander et al. |
| 2015/0227175 A1* | 8/2015 | Motosugi ............. G06F 1/1681 16/341 |
| 2015/0241978 A1 | 8/2015 | Lombardi et al. |
| 2015/0267450 A1 | 9/2015 | Chiang |
| 2015/0277506 A1 | 10/2015 | Cheah et al. |
| 2015/0309539 A1* | 10/2015 | Kamphuis ............ G06F 1/1681 361/679.27 |
| 2015/0345195 A1 | 12/2015 | Park |
| 2015/0361696 A1 | 12/2015 | Tazbaz |
| 2015/0362956 A1 | 12/2015 | Tazbaz |
| 2015/0362958 A1 | 12/2015 | Shang |
| 2016/0041589 A1 | 2/2016 | Tazbaz |
| 2016/0070310 A1 | 3/2016 | Holung et al. |
| 2016/0083988 A1 | 3/2016 | Hsu |
| 2016/0109908 A1 | 4/2016 | Siddiqui |
| 2016/0132075 A1 | 5/2016 | Tazbaz |
| 2016/0132076 A1 | 5/2016 | Bitz et al. |
| 2016/0147267 A1 | 5/2016 | Campbell et al. |
| 2016/0153222 A1 | 6/2016 | Hu |
| 2016/0187934 A1 | 6/2016 | Lee et al. |
| 2016/0187935 A1 | 6/2016 | Tazbaz et al. |
| 2016/0201367 A1 | 7/2016 | Kato |
| 2016/0215541 A1 | 7/2016 | Tazbaz et al. |
| 2016/0224072 A1 | 8/2016 | Huang et al. |
| 2016/0266615 A1* | 9/2016 | Uchiyama ............ G06F 1/1681 |
| 2016/0299537 A1 | 10/2016 | Whitt et al. |
| 2016/0326786 A1 | 11/2016 | Lee |
| 2016/0357226 A1 | 12/2016 | Campbell et al. |
| 2017/0017273 A1 | 1/2017 | Weldon et al. |
| 2017/0090523 A1 | 3/2017 | Tazbaz et al. |
| 2017/0145724 A1 | 5/2017 | Siddiqui |
| 2017/0145725 A1 | 5/2017 | Siddiqui |
| 2018/0059735 A1 | 3/2018 | Tazbaz et al. |
| 2018/0066465 A1 | 3/2018 | Tazbaz et al. |
| 2018/0164855 A1 | 6/2018 | Tazbaz et al. |
| 2018/0166842 A1 | 6/2018 | Siddiqui |

FOREIGN PATENT DOCUMENTS

| | | |
|---|---|---|
| CN | 203376667 U | 1/2014 |
| CN | 104331124 A | 2/2015 |
| CN | 204610543 U | 9/2015 |
| EP | 0928092 A2 | 7/1999 |
| EP | 1422593 A1 | 5/2004 |
| EP | 2466420 A1 | 6/2012 |
| EP | 2528307 A1 | 11/2012 |
| EP | 2797296 A2 | 10/2014 |
| GB | 2008940 A | 6/1979 |
| JP | 2006112523 A | 4/2006 |
| WO | 2007/072124 A1 | 6/2007 |
| WO | 2010/076639 A2 | 7/2010 |
| WO | 2010/093139 A2 | 8/2010 |
| WO | 2015/073020 A1 | 5/2015 |
| WO | 2015/147885 A1 | 10/2015 |
| WO | 2015/179257 A1 | 11/2015 |
| WO | 2017087343 A1 | 5/2017 |

OTHER PUBLICATIONS

"Acer Unveils Industry's First Convertible Chromebook with 13-inch Display," Aug. 31, 2016, retrieved at <<http://www.acer.com/ac/en/US/press/2016/202372>>, 2 pages.

"Special Purpose Hinges (cont.)," published Jan. 4, 2007, retrieved at <<http://hingedummy.info/specialpurposepage2.htm>> on Aug. 17, 2016, 2 pages.

"Asus Transformer Book Flip TP200SA 360-Degree Convertible Laptop With Quad-core Processor", published Oct. 18, 2015, retrieved from << http://www.tipandtrick.net/asus-transformer-book-flip-tp200sa-360-degree-convertible-laptop-full-review/>> on Oct. 26, 2015, 3 pages.

(56) References Cited

OTHER PUBLICATIONS

BESTEK® 10"-15" Laptop/Notebook Cooling Pad Six-level Changeable Stand with Dual 118mm Hydraulic Fan Dual USB 2.0 360 degree Rotatable Base BTCPZ4BL, published Nov. 20, 2014, retrieved from <<http://www.amazon.com/Notebook-Six-level-Changeable-Hydraulic-Rotatable/dp/B00L8IF6W0>> on Aug. 31, 2015, 5 pages.
Brown, Mlichael, "Dell targets younger audience with 360-degree laptops and thin, light All-in-One PCs", retrieved from <<http://www.pcworld.com/article/2304649/dell-targets-younger-audience-with-360-degree-laptops-and-thin-light-all-in-one-pcs.htm>>, published Jun. 2, 2014, 7 pages.
"Computex: Asus Transformer Book Flip series launched with 360 Degree Hinge", published Jun. 3, 2014, retrieved from <<http://tech.firstpost.com/news-analysis/computex-asus-transformer-book-flip-series-launched-with-360-degree-hinge-225064.html>> on Aug. 28, 2015, 4 pages.
Hinckley et al., "Codex: A Dual Screen Tablet Computer", In Proceedings of the SIGCHI Conference on Human Factors in Computing Systems, Boston, MA, CHI 2009—New Mobile Interactions, Apr. 9, 2009, pp. 1933-1942, 10 pages.
"HP Spectre introduce hybrid x360 laptop, rotate 360 degrees, $900", published Apr. 25, 2015, retrieved from <<http://sharetech.biz/hp-spectre-introduce-hybrid-x360-laptop-rotate-360-%E2%80%8B%E2%80%8Bdegrees-900/>> on Oct. 26, 2015, 4 pages.
Kravitz, Noah, "Kyocera Echo Unboxing—Dual-Screen Android Phone (video)", published Apr. 13, 2011, retrieved from <<http://www.technobuffalo.com/videos/kyocera-echo-unboxing-dual-screen-android-phone-video/>> on Oct. 26, 2015, 7 pages.
Pradeep, "HP Announces New Pavilion x360 Convertible Laptop Inspired by Lenovo Yoga, Price Starts At $400", Published Feb. 23, 2014, retrieved from <<http://microsoft-news.com/hp-announces-new-pavilion-x360-convertible-laptop-inspired-by-lenovo-yoga-price-starts-at-400/>> on Oct. 26, 2015, 9 pages.
Smith, Daria, "Lenovo's New Flex 3 Convertible Laptops Sport a 360 Degree Hinge", retrieved from <<http://blog.parts-people.com/2015/05/13/lenovos-new-flex-3-convertible-laptops-sport-a-360-degree-hinge/>>, published May 13, 2015, 2 pages.
Smith, Daria, "Microsoft Helps HP Design New Convertible Spectre x360," published Mar. 3, 2015, retrieved at <<http://blog.parts-people.com/2015/03/03/microsoft-helps-hp-design-ne-convertible-spectre-x360/>>, 1 page.
Smith, Sherri L., "Toshiba Satellite Radius Folds into 5 Different Modes", published May 27, 2014, retrieved at <<http://blog.laptopmag.com/toshiba-satellite-radius-specs-price>> on Sep. 1, 2015, 4 pages.
Villa, Jason de, "iPad mini case review: The best generic case you can get right now", published Jan. 1, 2013, retrieved from <<http://technoodling.net/ipad-mini-case-review-the-best-generic-case-you-can-get-right-now/>> on Aug. 28, 2015, 12 pages.
Wang, Harry, "The 360 Degrees (and 25,000 Hinge Tests) of Yoga Design," Dec. 5, 2012, retrieved at <<http://blog.lenevo.com/en/blog/the-360-degrees-of-yoga-design>>, 14 pages.
Non-Final Office Action dated Feb. 9, 2017 from U.S. Appl. No. 14/947,740, 35 pages.
Response filed Apr. 13, 2017 to the Non-Final Office Action dated Feb. 9, 2017 from U.S. Appl. No. 14/947,740, 9 pages.
International Search Report and Written Opinion dated Feb. 20, 2017 from PCT Patent Application No. PCT/US2016/061940, 13 pages.
Non-Final Office Action dated Nov. 3, 2016 from U.S. Appl. No. 14/947,994, 25 pages.
Response filed Jan. 11, 2017 to the Non-Final Office Action dated Nov. 3, 2016 from U.S. Appl. No. 14/947,994, 12 pages.
Final Office Action dated Feb. 16, 2017 from U.S. Appl. No. 14/947,994, 13 pages.
Response filed Apr. 3, 2017 to the Final Office Action dated Feb. 16, 2017 from U.S. Appl. No. 14/947,994, 9 pages.
Applicant-Initiated Interview Summary dated Apr. 4, 2017 from U.S. Appl. No. 14/947,994, 3 pages.
International Search Report and Written Opinion dated Feb. 16, 2017 from PCT Patent Application No. PCT/US2016/061942, 12 pages.
"Double geared hinge", retrieved at <<http://www.wamungo.com/PrintModel/Detail/Double-geared-hinge-5305a74589702816c05d1ab5>>, on Mar. 10, 2017, 6 pages.
Martin, Harlan, "Geared Hinge", published on Jan. 27, 2015, retrieved at <<https://www.thingiverse.com/make:116451>> on Aug. 9, 2017, 1 page.
Non-Final Office Action dated Jul. 17, 2017 from U.S. Appl. No. 14/947,994, 23 pages.
Final Office Action dated Jun. 14, 2017 from U.S. Appl. No. 14/947,740, 25 pages.
Applicant-Initiated Interview Summary dated Aug. 8, 2017 from U.S. Appl. No. 14/947,740, 3 pages.
Response filed Aug. 9, 2017 to the Final Office Action dated Jun. 14, 2017 from U.S. Appl. No. 14/947,740, 9 pages.
Non-Final Office Action dated Aug. 28, 2017 from U.S. Appl. No. 14/947,740, 21 pages.
Article 34 Amendment and Chapter II Demand filed Jun. 19, 2017 from PCT Patent Application No. PCT/US2016/061940, 21 pages.
Article 34 Amendment and Chapter II Demand filed May 19, 2017 from PCT Patent Application No. PCT/US2016/061942, 14 pages.
Domingo, Joel Santo, "Laptop, Tablet, or Both? How to Decide", retrieved from <<http://in.pcmag.com/laptops/64076/feature/laptop-tablet-or-both-how-to-decide>>, published May 1, 2014, 11 pages.
Written Opinion dated Sep. 6, 2017 from PCT Patent Application No. PCT/US2016/061940, 9 pages.
Final Office Action dated Nov. 2, 2017 from U.S. Appl. No. 14/947,994, 44 pages.
Written Opinion dated Aug. 24, 2017 from PCT Patent Application No. PCT/US2016/061942, 7 pages.
"Non Final Office Action Issued in U.S. Appl. No. 15/255,056", dated Sep. 28, 2018, 11 Pages.
"Notice of Allowance Issued in U.S. Appl. No. 15/691,524", dated Sep. 24, 2018, 10 Pages.
"International Search Report and Written Opinion Issued in PCT Application No. PCT/US18/034245", dated Aug. 13, 2018, 14 pages.
"Moving Point Hinge—Multi Pivot Hinge", Retrieved from http://websystem.gismo.se/Gismo/files/1029/2.mph%2001%20introduktion.pdf, Retrieved on Oct. 9, 2014, 6 Pages.
"Non Final Office Action Issued in U.S. Appl. No. 14/555,184", dated Apr. 12, 2016, 32 Pages.
"Non Final Office Action Issued in U.S. Appl. No. 14/947,994", dated Apr. 5, 2018, 28 Pages.
"Non Final Office Action Issued in U.S. Appl. No. 15/239,417", dated May 25, 2017, 71 Pages.
"Non Final Office Action Issued in U.S. Appl. No. 15/256,302", dated May 1, 2018, 9 Pages.
"Non Final Office Action Issued in U.S. Appl. No. 15/374,594", dated Sep. 19, 2017, 11 Pages.
Elliot, Amy-Mae, "9 Nifty Laptop Feet to Keep Your PC Running Cool", Retrieved from https://mashable.com/2012/07/30/laptop-feet/#norOLvMOFaqy, Jul. 30, 2012, 26 Pages.
"International Preliminary Report on Patentability Issued in PCT Application No. PCT/US2015/060959", dated Mar. 3, 2017, 7 Pages.
"International Search Report & Written Opinion Issued in PCT Application No. PCT/US2015/060959", dated Jan. 25, 2016, 11 Pages.
"Second Written Opinion issued in PCT Appiication No. PCT/US2015/060959", dated Oct. 10, 2016, 7 Pages.
"International Search Report and Written Opinion Issued in PCT Application No. PCT/US2017/013591", dated Apr. 21, 2017, 11 Pages.
"International Search Report and Written Opinion issued in PCT Application No. PCT/US2017/013687", dated Apr. 21, 2017, 12 Pages.
"International Search Report & Written Opinion Issued in PCT Application No. PCT/US2018/013036", dated Apr. 6, 2018, 11 pages.

(56) References Cited

OTHER PUBLICATIONS

Final Office Action dated Feb. 5, 2018 from U.S. Appl. No. 14/47,740, 54 pages.
International Preliminary Report on Patentability dated Jan. 23, 2018 from PCT Patent Application No. PCT/US2016/061940, 10 pages.
International Report on Patentability dated Jan. 18, 2018 from PCT Patent Application No. PCT/US20161061942, 10 pages.
Non-Final Office Action dated Jun. 9, 2017 from U.S. Appl. No. 15/256,302, 17 pages.
"Final Office Action Issued in U.S. Appl. No. 15/256,302", dated Oct. 17, 2018, 12 Pages.
"International Search Report & Written Opinion Issued in PCT Application No. PCT/US18/034011", dated Nov. 16, 2018, 13 Pages.

* cited by examiner

HINGED DEVICE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DESCRIPTION

The present concepts relate to devices, such as computing devices employing hinges that can rotationally secure first and second device portions relative to a first hinge axis that relates to the first portion and a second hinge axis that relates to the second portion. The order of rotation and/or extent of rotation can be controlled for the two hinge axes. For instance, rotation could start around the first hinge axis, switch to the second hinge axis, and then return to the first hinge axis. The rotation can be controlled through the use of detents associated with the first and second hinge axes. In some cases, relative sizes of individual detents can be selected to affect the relative order of rotation. Thus, from one perspective the hinges can be viewed as detent-priority determinant hinges. The detents can control the order of rotation relative to the two hinge axes, extent of rotation relative to the hinge axes, and/or provide resistance to maintain particular orientations of the first and second portions.

Figure 1:
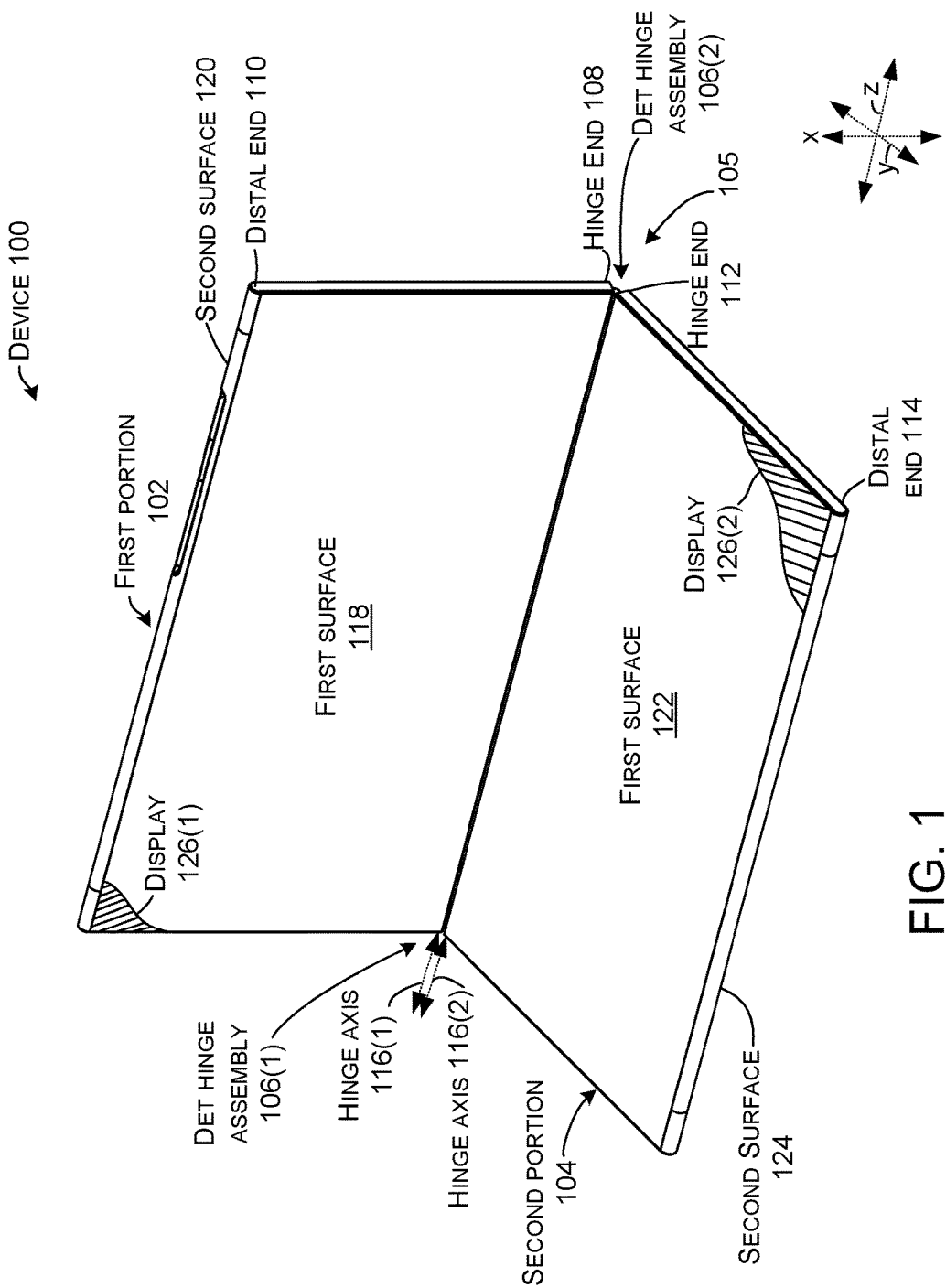
FIGS. 1, 2A-2D, 4A, 5A, 6A, 7A, and 8A show perspective views of example devices in accordance with some implementations of the present concepts.

Introductory FIG. 1 shows an example device 100 that has first and second portions 102 and 104 that are rotatably secured together by a hinge 105, which in this case is manifest as a pair of a determinative hinge assemblies 106. The first portion 102 can extend from a hinge end 108 to a distal end 110. The second portion 104 also can extend from a hinge end 112 to a distal end 114. The hinge 105 can define two hinge axes 116. The first portion 102 can rotate around first hinge axis 116(1) and the second portion 104 can rotate around second hinge axis 116(2). The first portion 102 can include opposing first and second major surfaces 118 and 120 (hereinafter, first and second surfaces). Similarly, the second portion 104 can include opposing first and second major surfaces 122 and 124 (hereinafter, first and second surfaces). (Note the second surfaces 120 and 124 are facing away from the viewer and as such are not directly visible in this view, but are shown and designated in subsequent FIGS.).

In some implementations, displays 126 can be positioned on the first and/or second surfaces. In this case, displays 126(1) and 126(2) are interposed between the determinative hinge assemblies 106(1) and 106(2). In the illustrated configuration, the displays 126 are positioned on first surfaces 118 and 122, respectively.

Figure 2A:
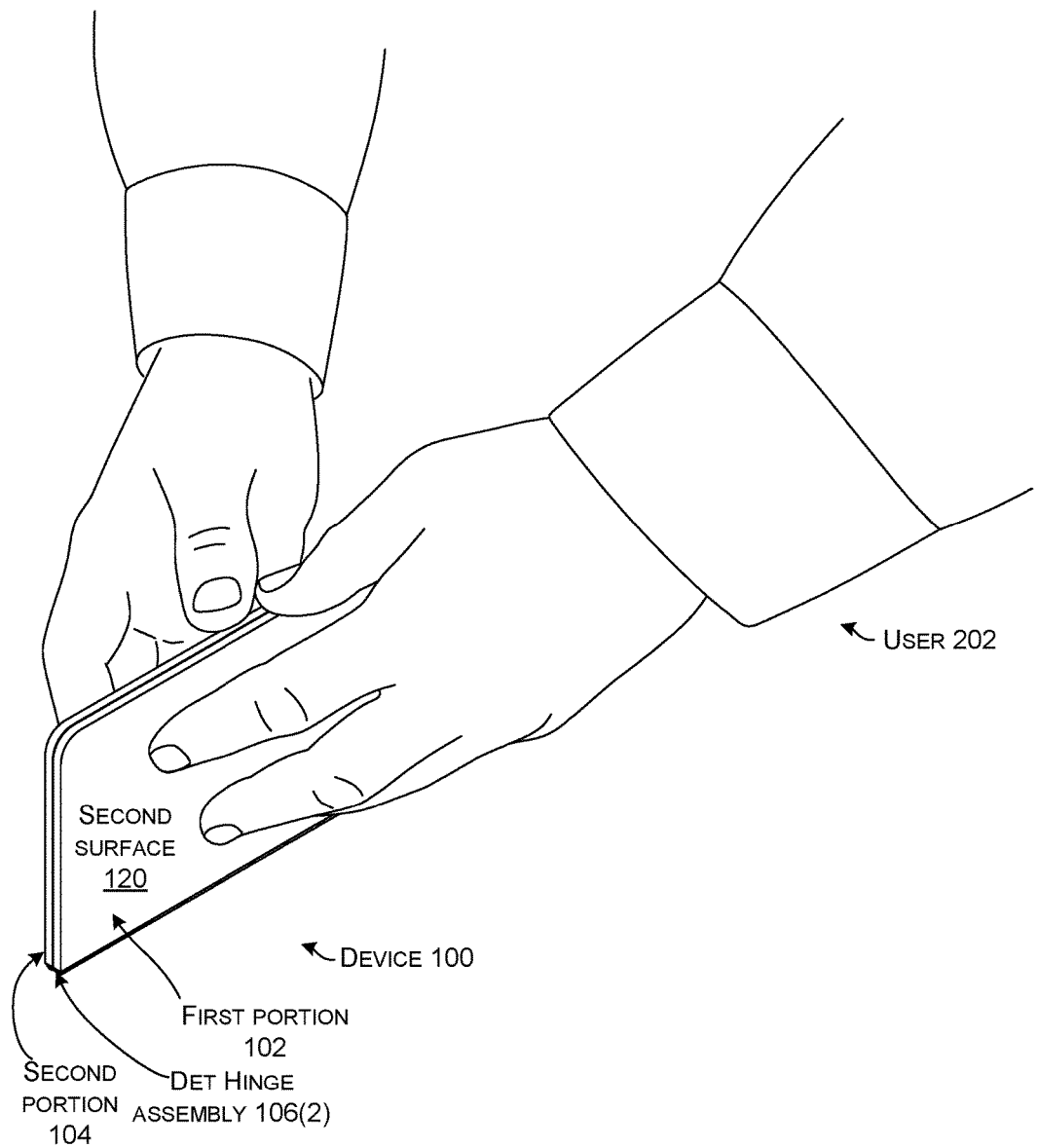

FIGS. 2A-2D collectively show a use case scenario of device 100. FIG. 2A starts with device 100 in the closed orientation where the first and second portions 102 and 104 are positioned against one another and are rotatably secured by determinative hinge assemblies 106. In this case, the second surfaces are facing outwardly with the first portion's second surface 120 facing the reader and the first surfaces (designated in FIG. 2B) facing inwardly. The closed orientation can be very compact and easy for the user 202 to transport. For instance, the device may fit in the user's pocket. Further, the first surfaces can be protected in this closed orientation by the second surfaces. The device can be biased to maintain this orientation until acted upon by the user. At this point user 202 is starting to open the device 100 (e.g., rotate the device portions 102 and 104 away from one another).

Figure 2B:
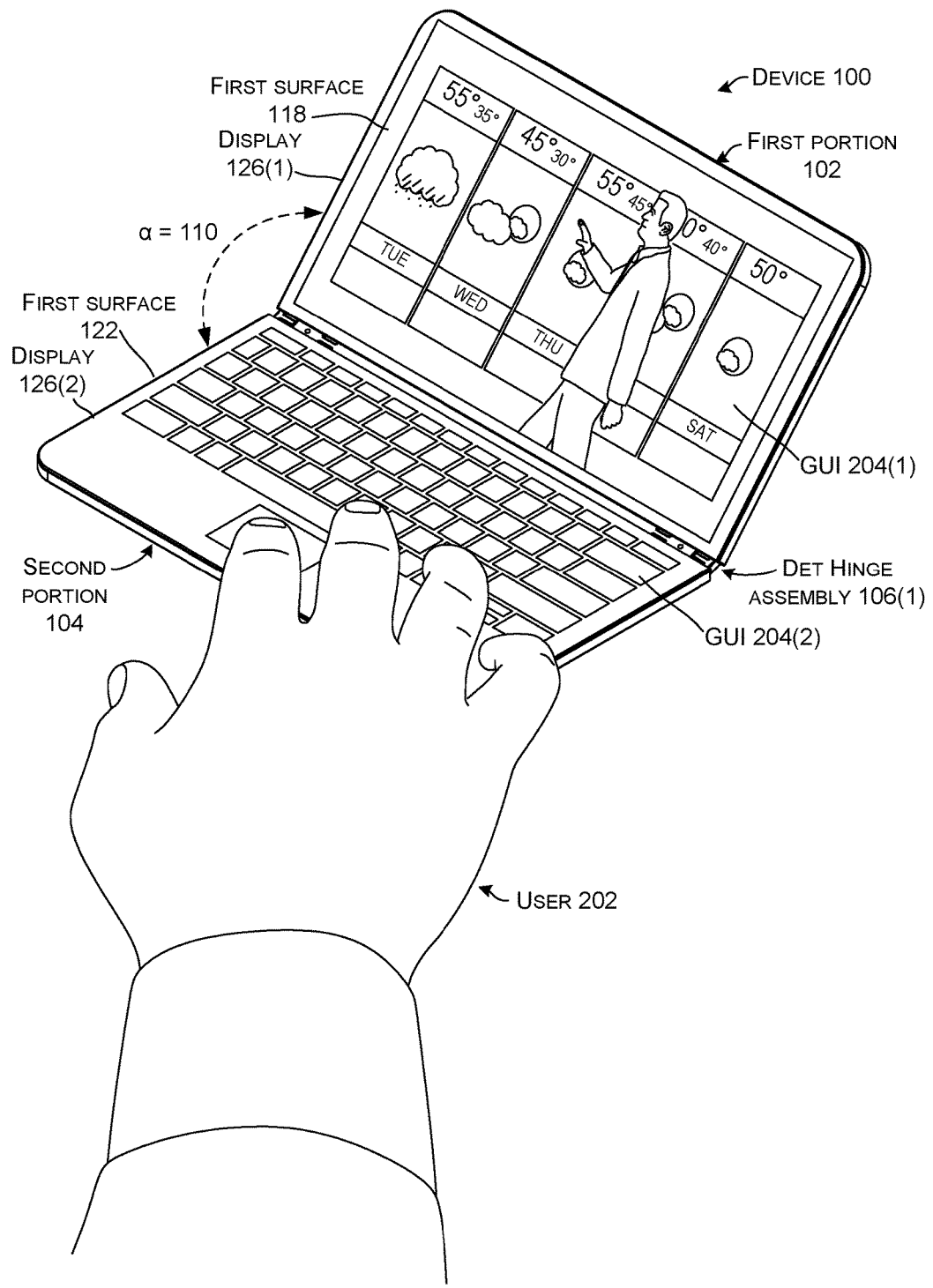

FIG. 2B shows the device 100 opened to an angle α, defined between the first and second portions 102 and 104, of about 110 degrees. The determinative hinge assemblies 106 can bias the first and second portions to maintain this orientation (e.g., device maintains orientation unless acted upon by the user). This orientation can be thought of as a 'notebook' or 'laptop' orientation. The notebook orientation can be manifest as an angle in a range from about 90 degrees to about 150 degrees. In this case, the device portions 102 and 104 are configured to maintain this relative orientation while the user 202 uses the device. In this example, video content is presented on a GUI 204(1) on display 126(1) of the first portion 102 and a virtual keyboard is presented on display 126(2) on second portion 104. The user can control GUI 204(1) via the virtual keyboard of GUI 204(2).

Figure 2C:
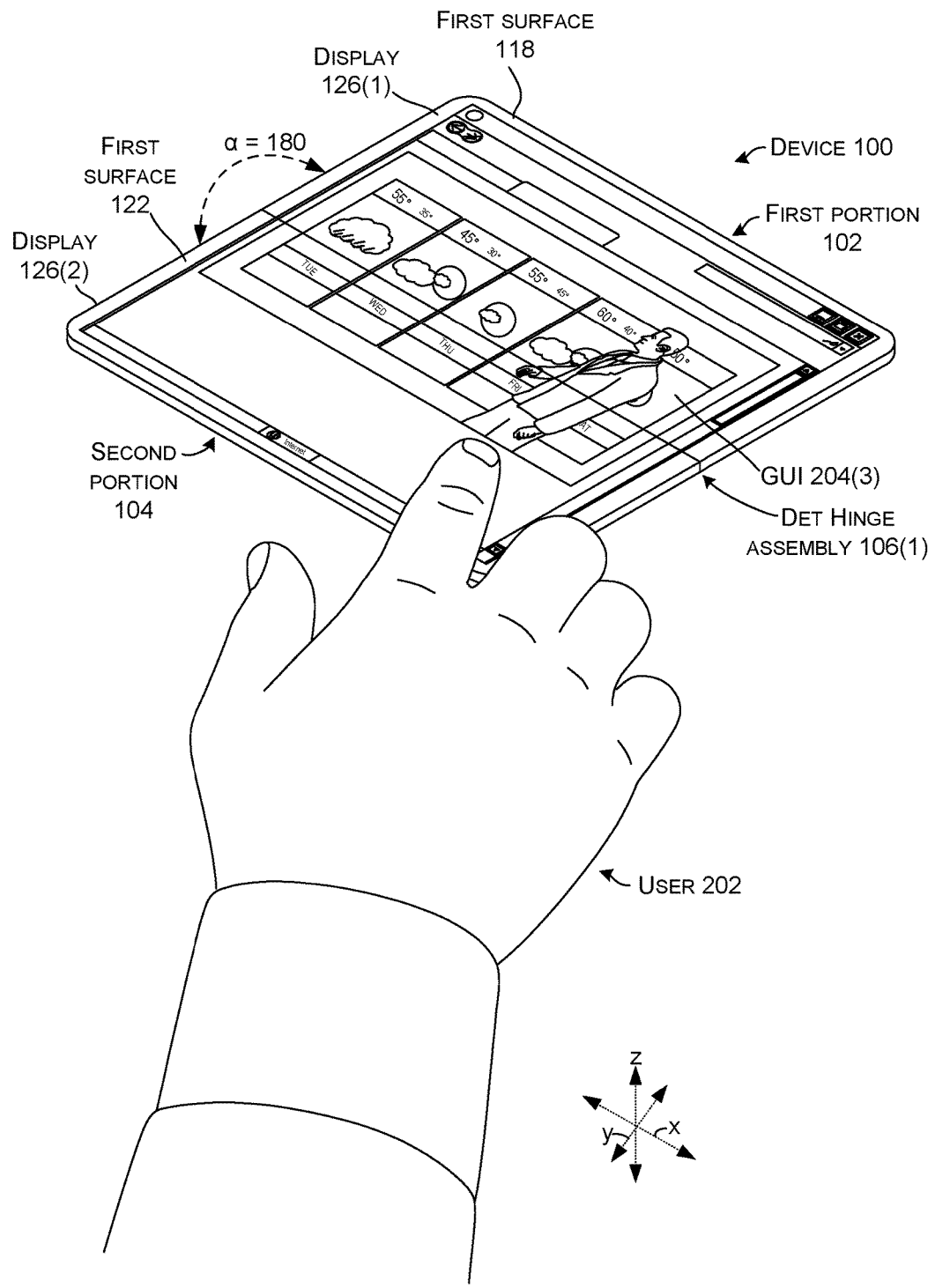

FIG. 2C shows the device 100 rotated until the relative angle α is about 180 degrees between the first and second portions 102 and 104. In this orientation, a single GUI 204(3) can be presented collectively across displays 126(1) and 126(2). This GUI 204(3) offers basically twice the display area of either device portion 102 or 104. The device can be biased to maintain this fully open orientation for viewing, yet when not utilized by the user 202, the user can close the device 100 to a compact easy to carry configuration (e.g., see FIG. 2A) that protects the displays 126 from damage.

Figure 2D:
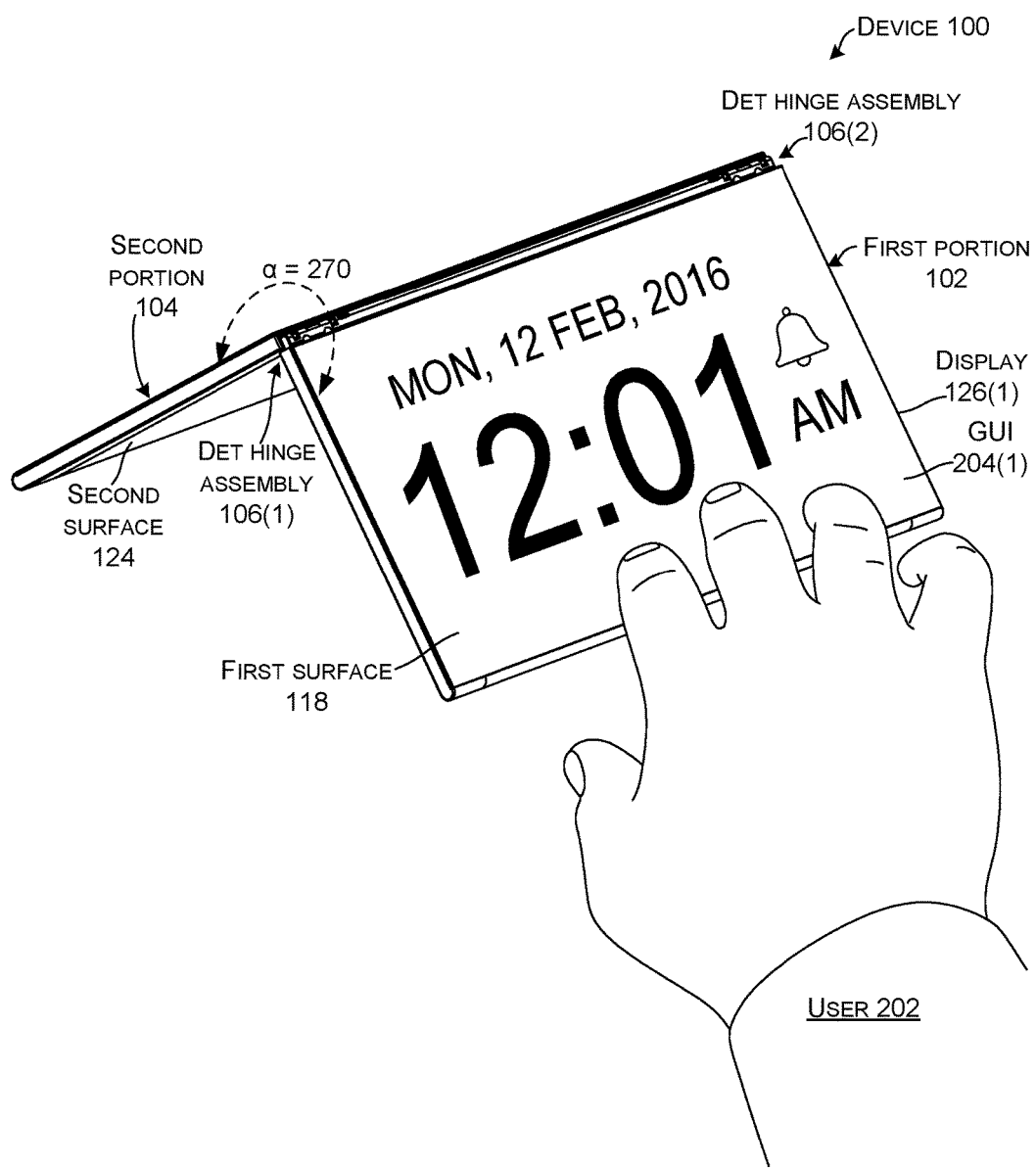

FIG. 2D shows another orientation where the angle α is about 270 degrees (or in a range from about 240 degrees to about 330 degrees). The determinative hinge assemblies 106 can bias the device to maintain this orientation so the device does not fold up or fall over. This orientation can be thought of as an 'alarm clock' orientation where the device stands on its own and the displays 126 are readily visible to the user.

Note that while obscured by the displays 126, several electronic components, such as circuit boards, processors, and/or storage/memory can be secured to the first and second portions 102 and/or 104.

The processor can generate GUIs 204 for presentation on the displays 126. In some implementations, the processor may generate different GUIs for the displays when the first and second portions 102 and 104 are in some orientations and a single GUI for a combined presentation in other orientations. For instance, when the first and second portions are oriented at 90 degrees relative to one another, the processor may generate a first GUI for presentation on the first portion and a second GUI for presentation on the second portion. When the first and second portions are oriented to 180 degrees, the processor can generate a single GUI that is collectively presented across both displays to create a larger display area. In other orientations, such as the alarm clock orientation, the same GUI may be presented on both the first and second portions. For instance, the time could be presented on both portions so that it is visible from more positions around the device.

Stated another way, in some configurations, the first surfaces 118 and 122 can be manifest as displays 126, such that in the fully open orientation of FIG. 2C the displays can work cooperatively to create a larger (e.g., 2x) display area. In some cases, the second surfaces 120 and 124 can be manifest as protective covers so that in the orientation of FIG. 2A the protective covers protect the displays of the first surfaces. In other configurations, both the first and second surfaces can include displays, or neither can include displays.

FIGS. 3-8C collectively show example determinative hinge assembly 106(1).

Figure 3:
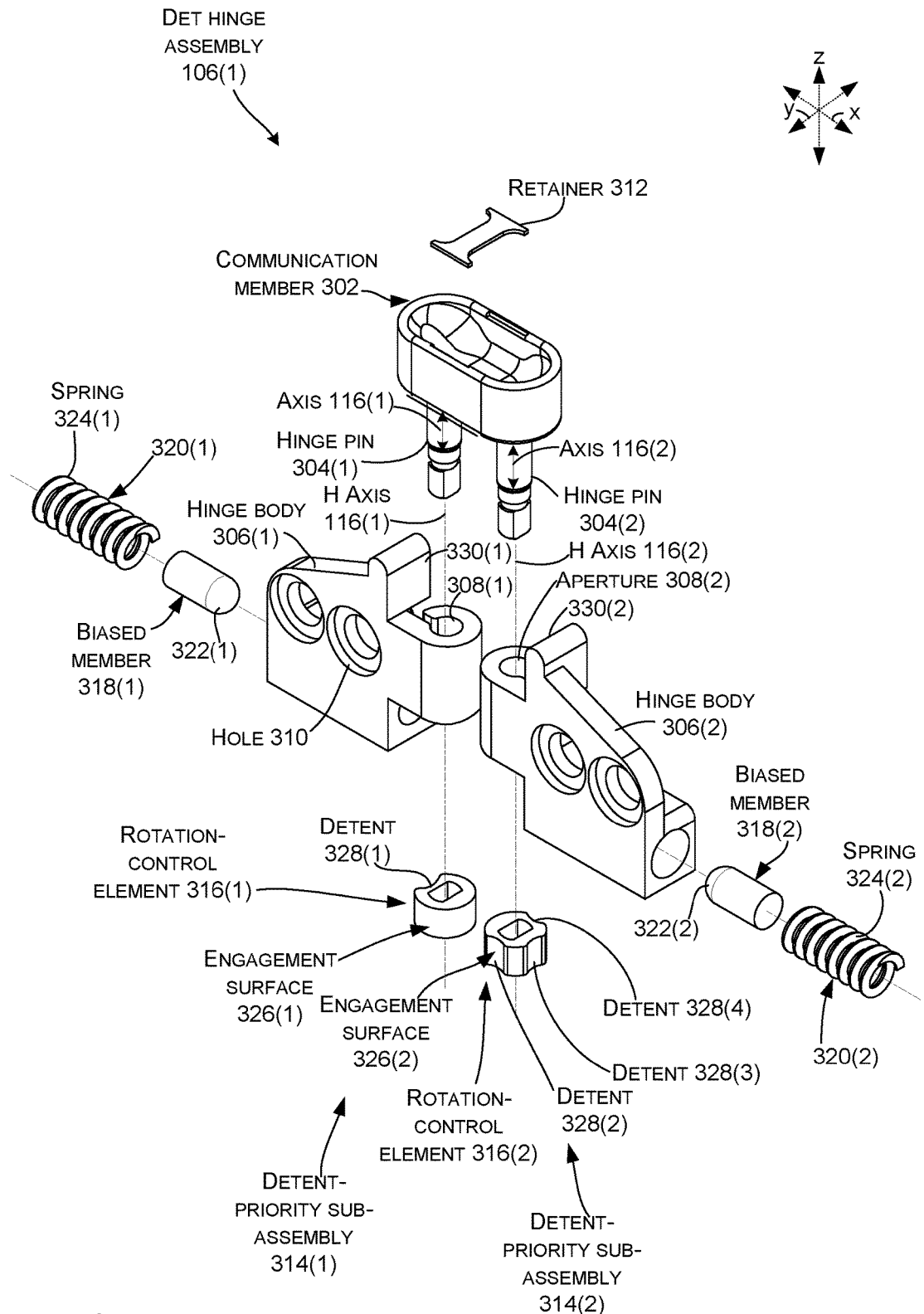
FIG. 3 shows an exploded perspective view of an example device in accordance with some implementations of the present concepts.

FIG. 3 is an exploded view that shows details of example determinative hinge assembly 106(1). The determinative hinge assembly 106(1) can include a communication member 302 that defines first and second hinge pins 304(1) and 304(2) and first and second hinge bodies 306(1) and 306(2). The hinge pins 304(1) and 304(2) can be parallel to one another and extend along hinge axes 116(1) and 116(2), respectively. The hinge pins can engage the hinge bodies 306 via apertures 308 in the hinge bodies. The hinge pins can be integrated as a part of the communication member or the hinge pins can be separate pieces that are assembled to the communication member. In some implementations, the apertures 308 can be sized so that the hinge bodies 306 act as friction cylinders for the hinge pins 304 (e.g., provide a degree of frictional resistance that can hold the portions in an existing orientation unless acted upon by the user). Hinge bodies 306 can be secured to the first and second portions 102 and 104, such as by fasteners (not shown) extending through holes 310 (not all of which are designated with specificity) into the first and second portions 102 and 104.

A retainer 312 can engage communication member 302 to retain conductors (not specifically shown) extending from the first portion 102 to the second portion 104 through the communication member. For instance, the conductor(s) can connect displays and/or other electronic components on the first portion with displays and/or other electronic components on the second portion.

The determinative hinge assembly 106(1) can include detent-priority sub-assemblies 314(1) and 314(2). In this case, the detent-priority sub-assemblies 314 can include a rotation-control element 316, biased member 318, and a biasing element 320. In this example, the biased member 318 can include a bearing surface 322, which may be a fixed structure or a rolling structure, such as a ball-shaped follower or a roller-shaped follower. The biasing element 320 can bias the biased member 318 toward the rotation-control element 316. In this case, the biasing element 320 is manifest as a compression spring 324. (While not specifically indicated, the compression spring 324 can be contained in the hinge body 306 (e.g., an end opposite the spring end contacting the biased member can be contained by the hinge body) so that the spring exerts a force on the biased member toward the hinge axes 116. Other types of springs and/or other biasing materials, such as foam are contemplated and can be employed.

The rotation-control element 316 can define an engagement surface 326 that includes one or more detents 328. In this example, rotation-control element 316(1) includes detent 328(1) and rotation-control element 316(2) includes three detents, 328(2), 328(3), and 328(4). The rotation-control elements 316 can be attached in a non-rotating manner to the hinge pins 304 (e.g., the rotation-control elements do not rotate relative to the hinge pins). In this case, the rotation-control elements and the hinge pins are keyed with corresponding rectangular female and male shapes to prevent rotation. Other configurations are contemplated. For instance, the rotation control elements could be threaded and/or glued onto the hinge pins.

The illustrated implementation can also include rotation limiters 330 that define the endpoints of rotation around an individual hinge axis 116. In this case, the rotation limiters are manifest as shoulders on the hinge bodies 306. When the shoulder contacts the communication member 302, further rotation in that direction is blocked. As will be explained below by way of example, the shoulders contact the communication member at zero degrees and 180 degrees.

Figure 4A:
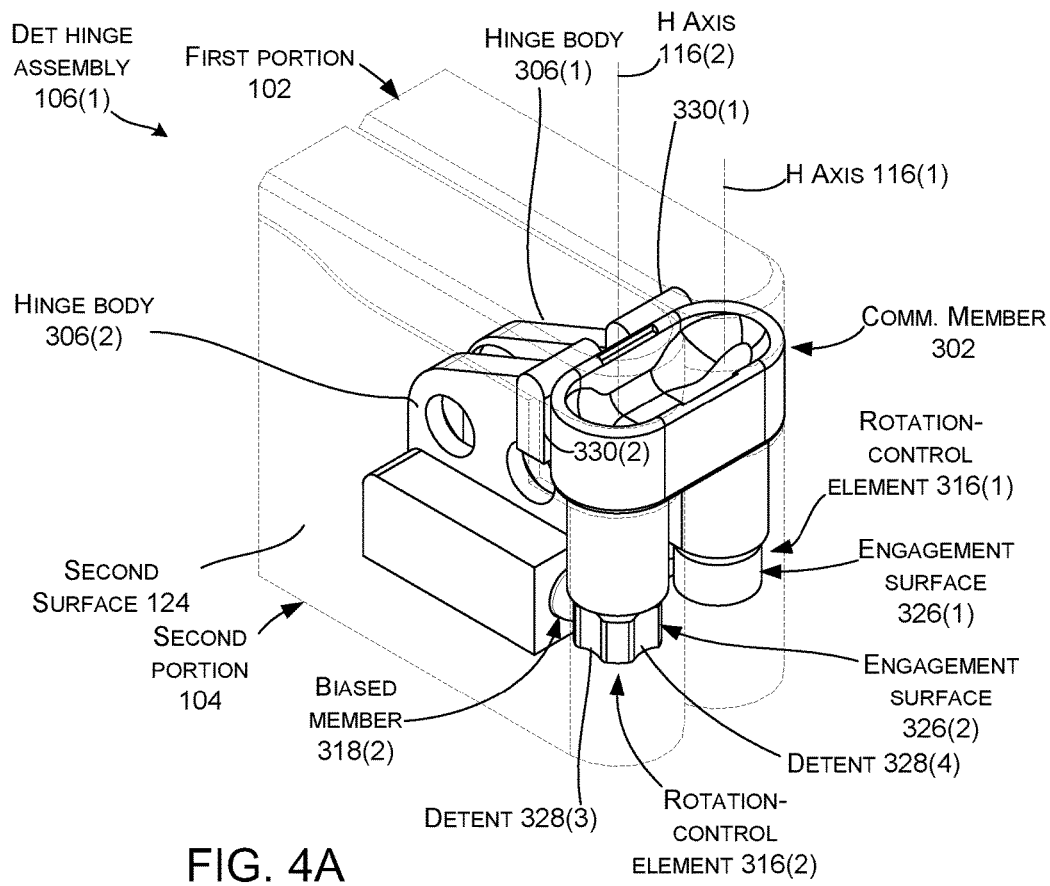
Figure 6A:
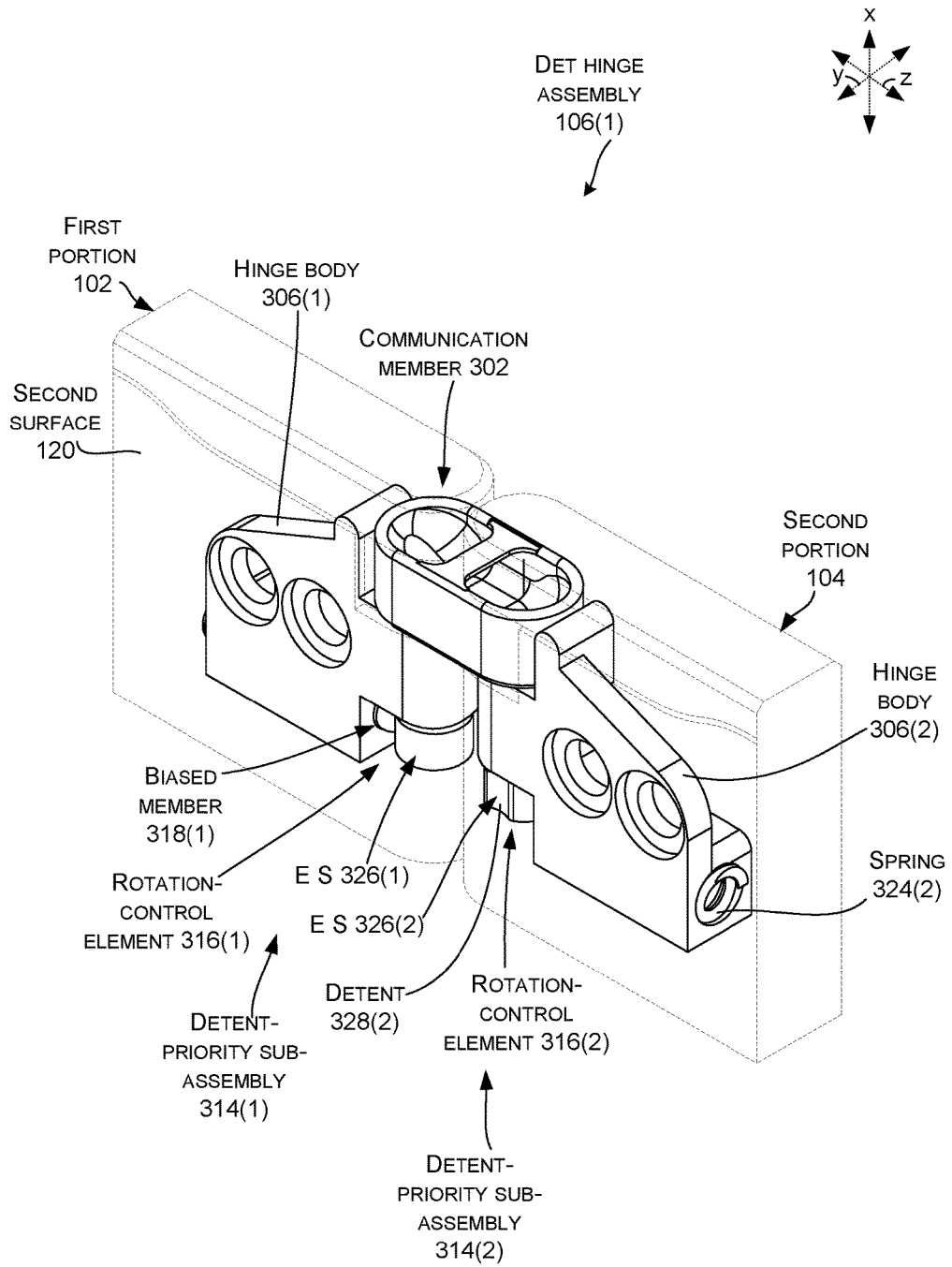
Figure 6B:
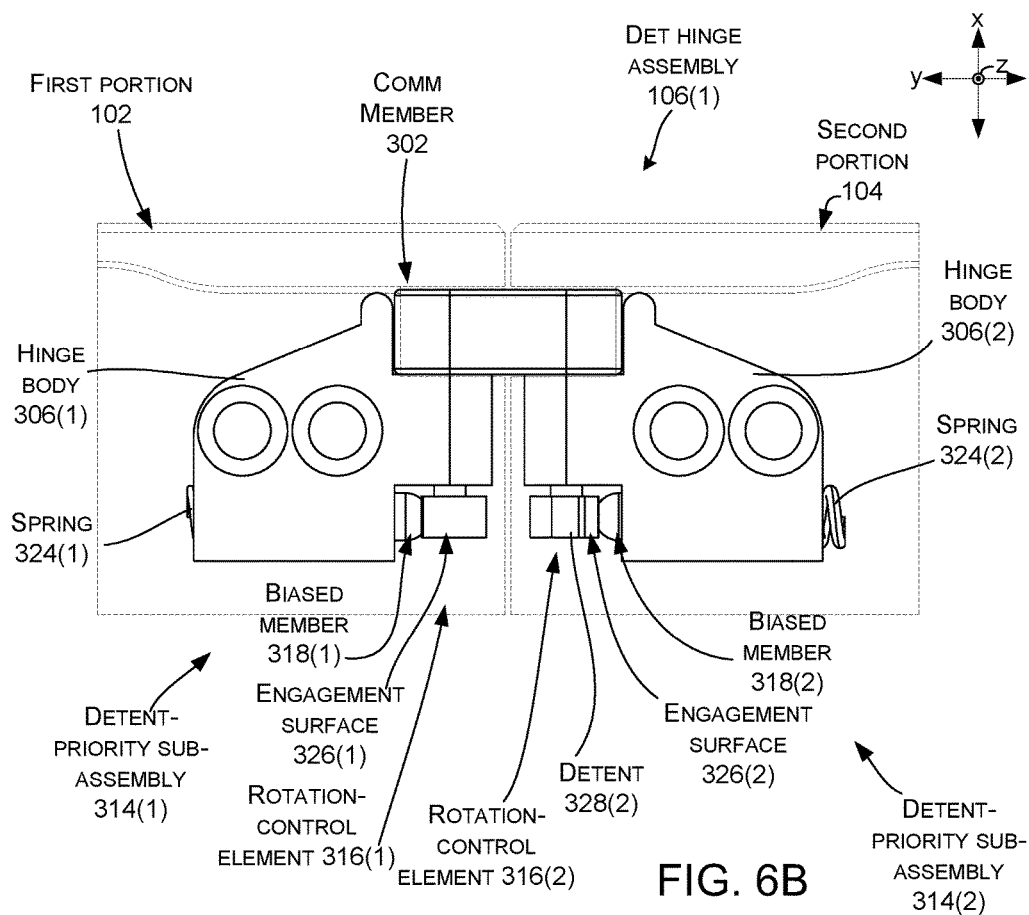
Figure 6C:
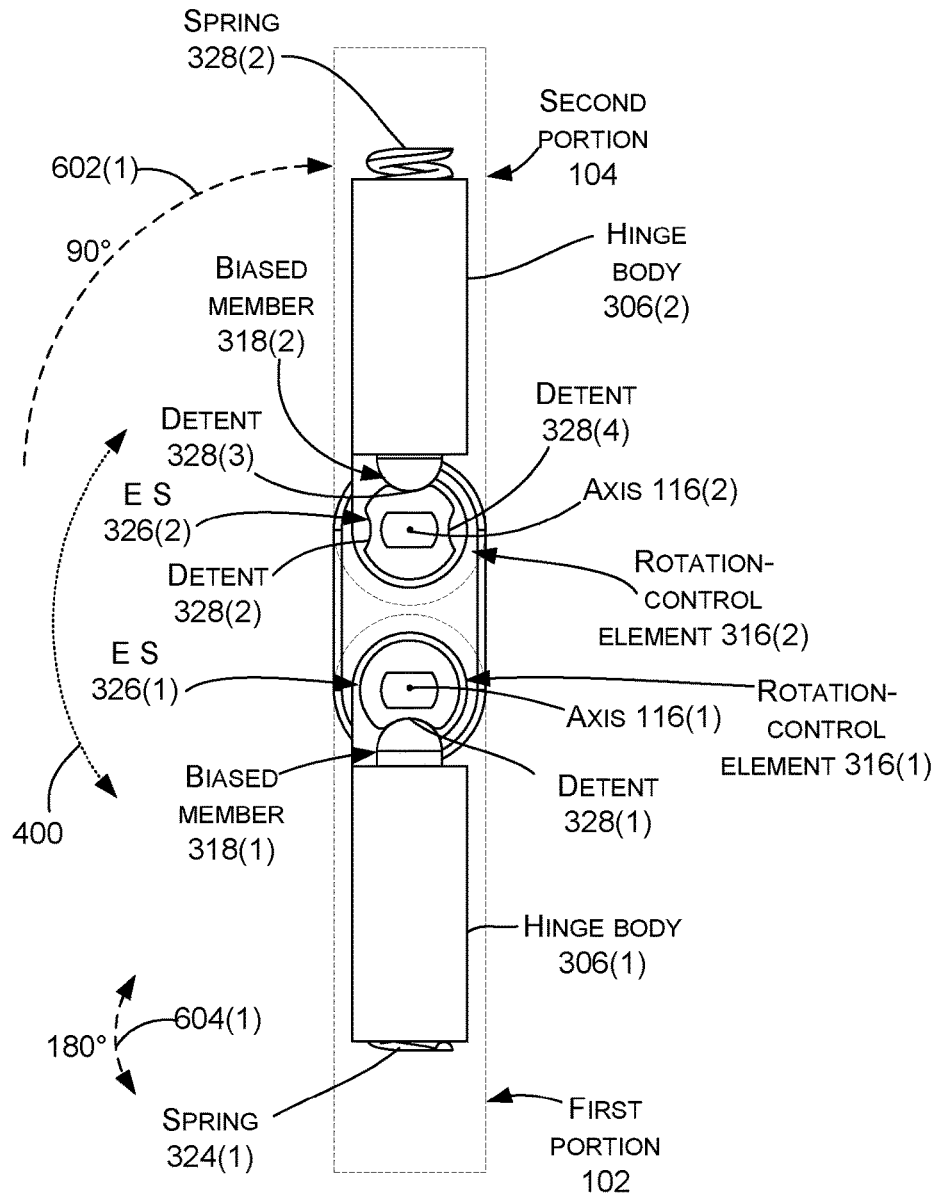
Figure 6C:
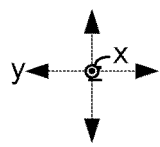
Figure 7A:
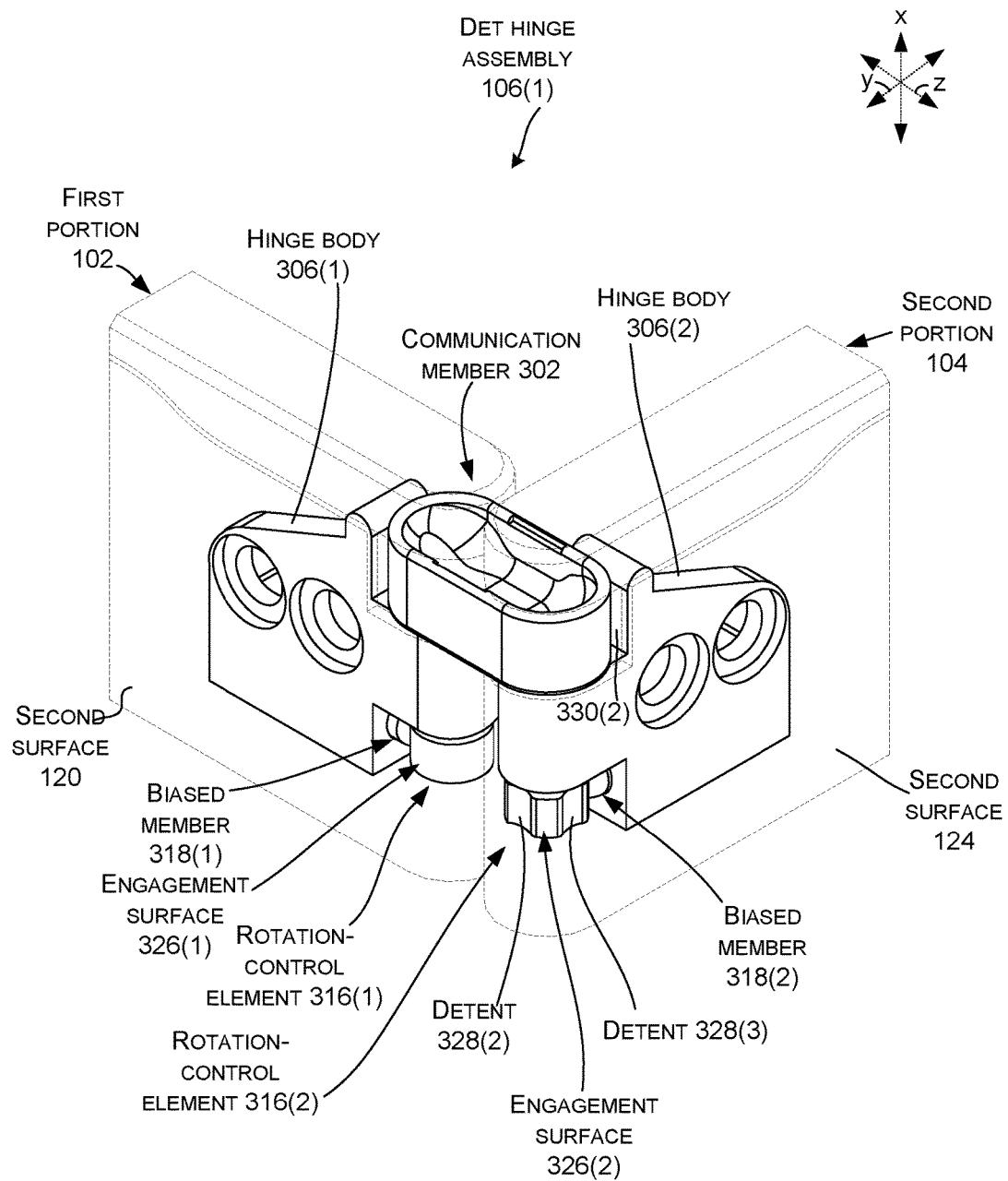
Figure 7B:
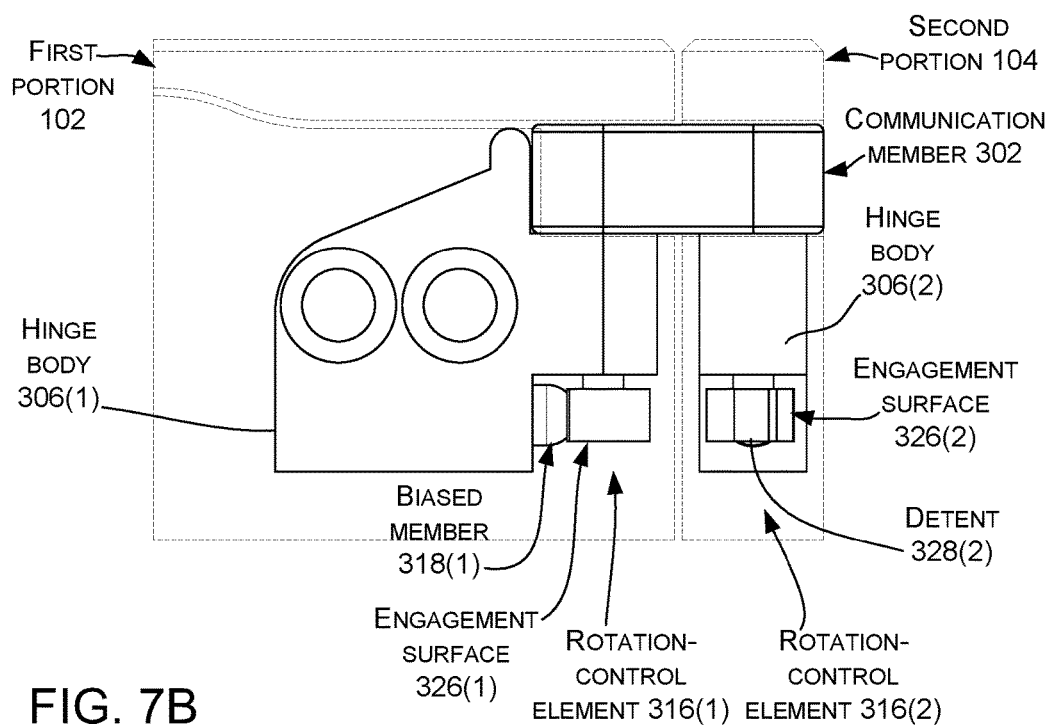
Figure 7C:
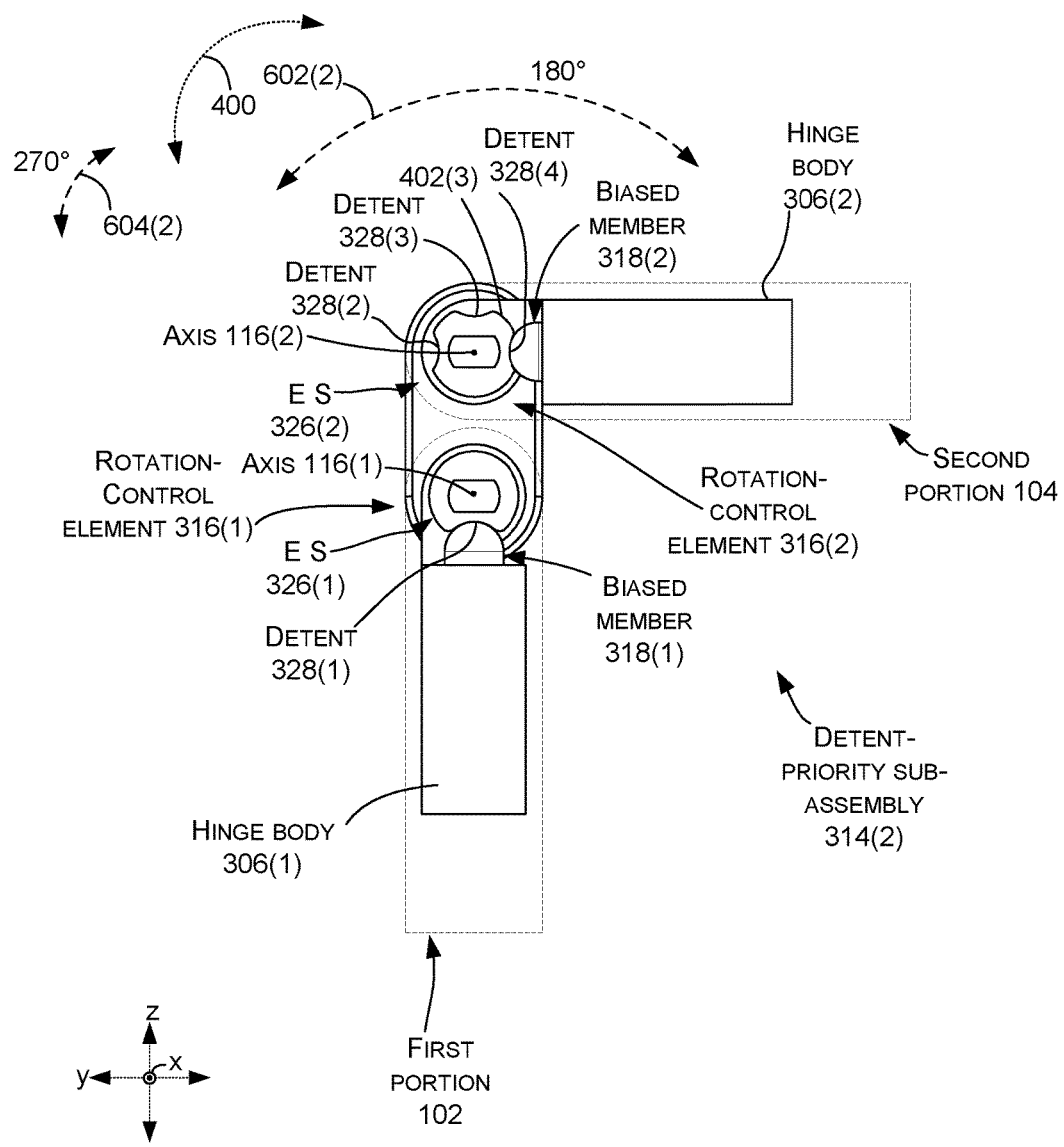
Figure 8A:
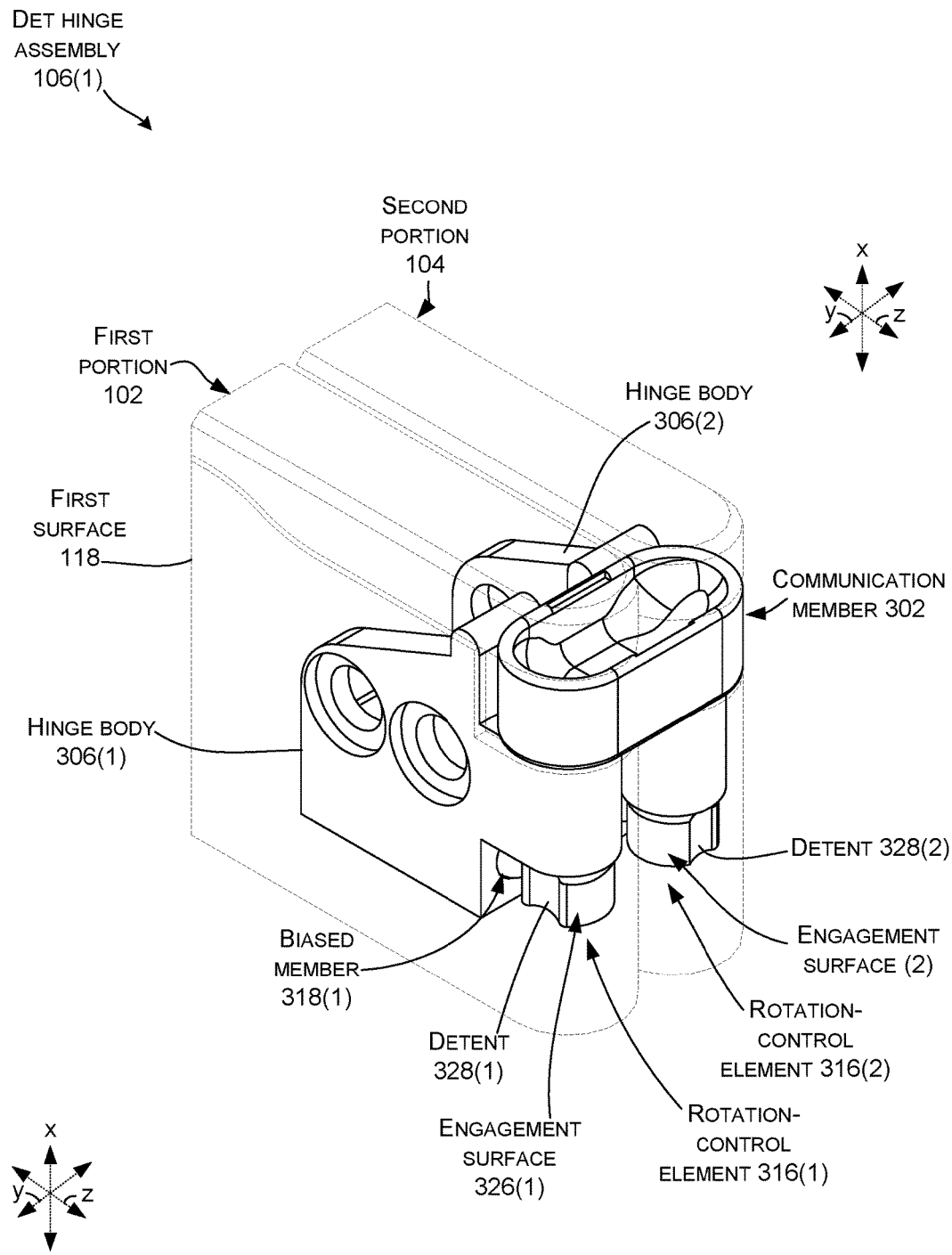
Figure 8B:
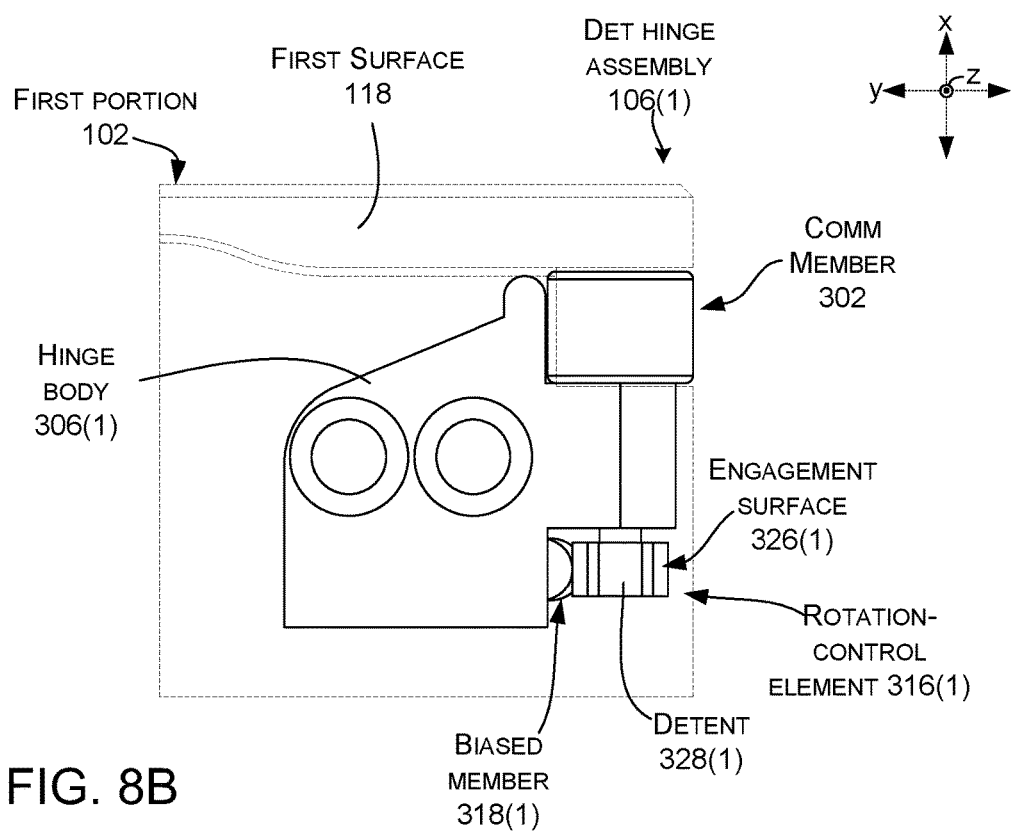
Figure 8C:
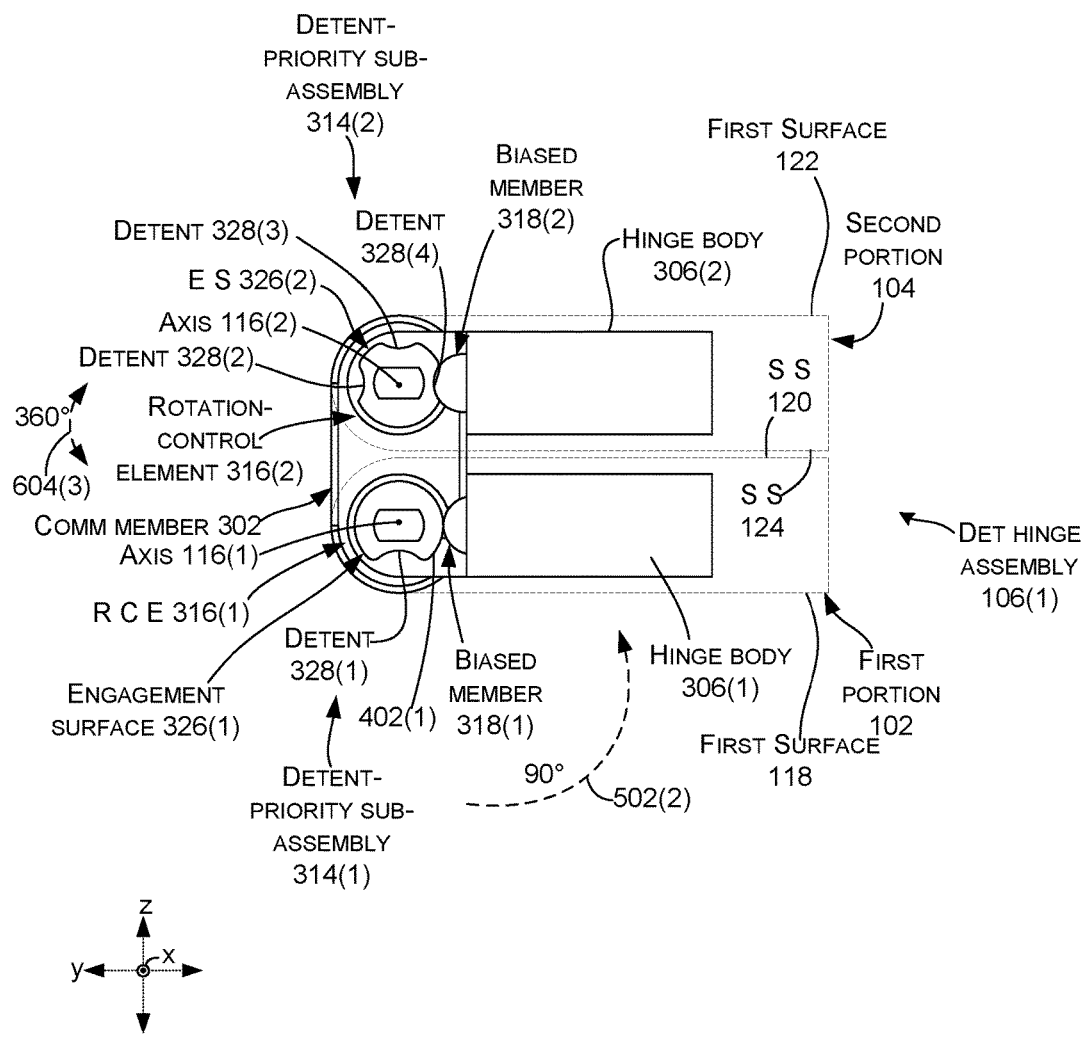

FIGS. 4A-8C collectively show how determinant hinge assembly 106(1) can control rotation of the first and second portions 102 and 104 around hinge axes 116(1) and 116(2). FIGS. 4A-4C show the first and second portions at a zero-degree orientation similar to FIG. 2A with the first surfaces 118 and 122 facing inwardly and the second surfaces 120 and 124 facing outwardly. FIG. 4A is a perspective view, FIG. 4B is a side elevational view (e.g., parallel to the hinge axes 116), and FIG. 4C is a bottom elevational view (e.g., along the hinge axes). FIGS. 5A-5C are similar views to FIGS. 4A-4C at a 90-degree orientation rather than a zero-degree orientation. Similarly, FIGS. 6A-6C are similar views at 180-degree orientations. FIGS. 7A-7C are similar views at 270-degree orientations and FIGS. 8A-8C are similar views at 360-degree orientations. For ease of explanation relative to FIGS. 4C, 5C, 6C, 7C, and 8C, communication member 302 is maintained in a fixed orientation while the first and second portions are rotated.

Figure 4B:
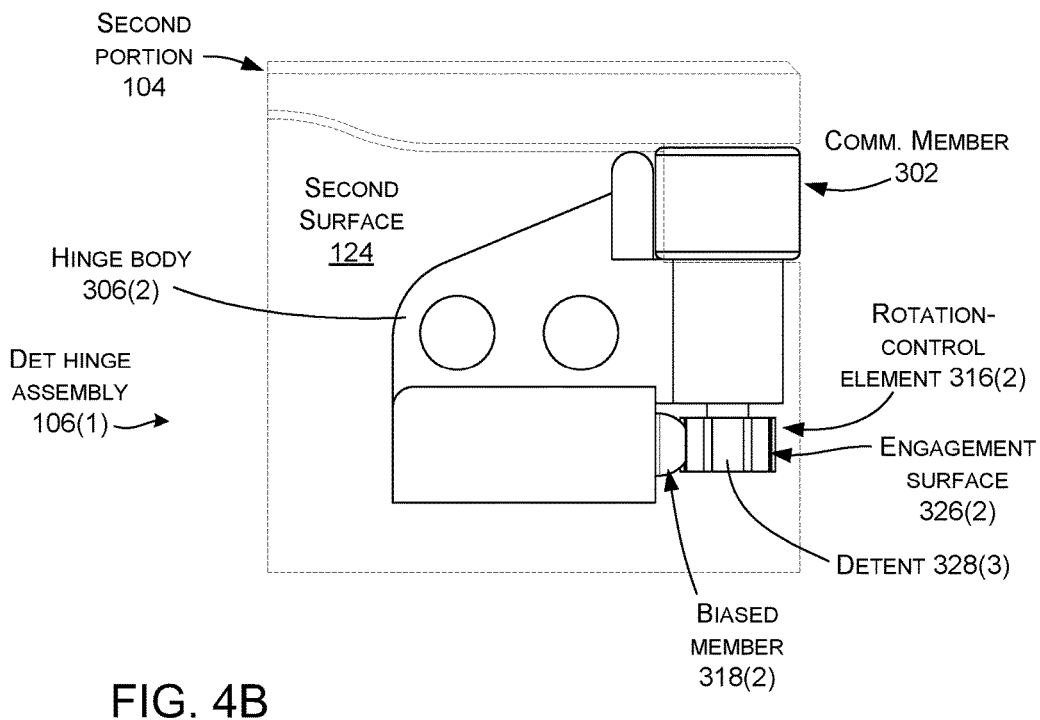
FIGS. 4B, 4C, 5B, 5C, 6B, 6C, 7B, 7C, 8B, and 8C show elevational views of example devices in accordance with some implementations of the present concepts.
Figure 4C:
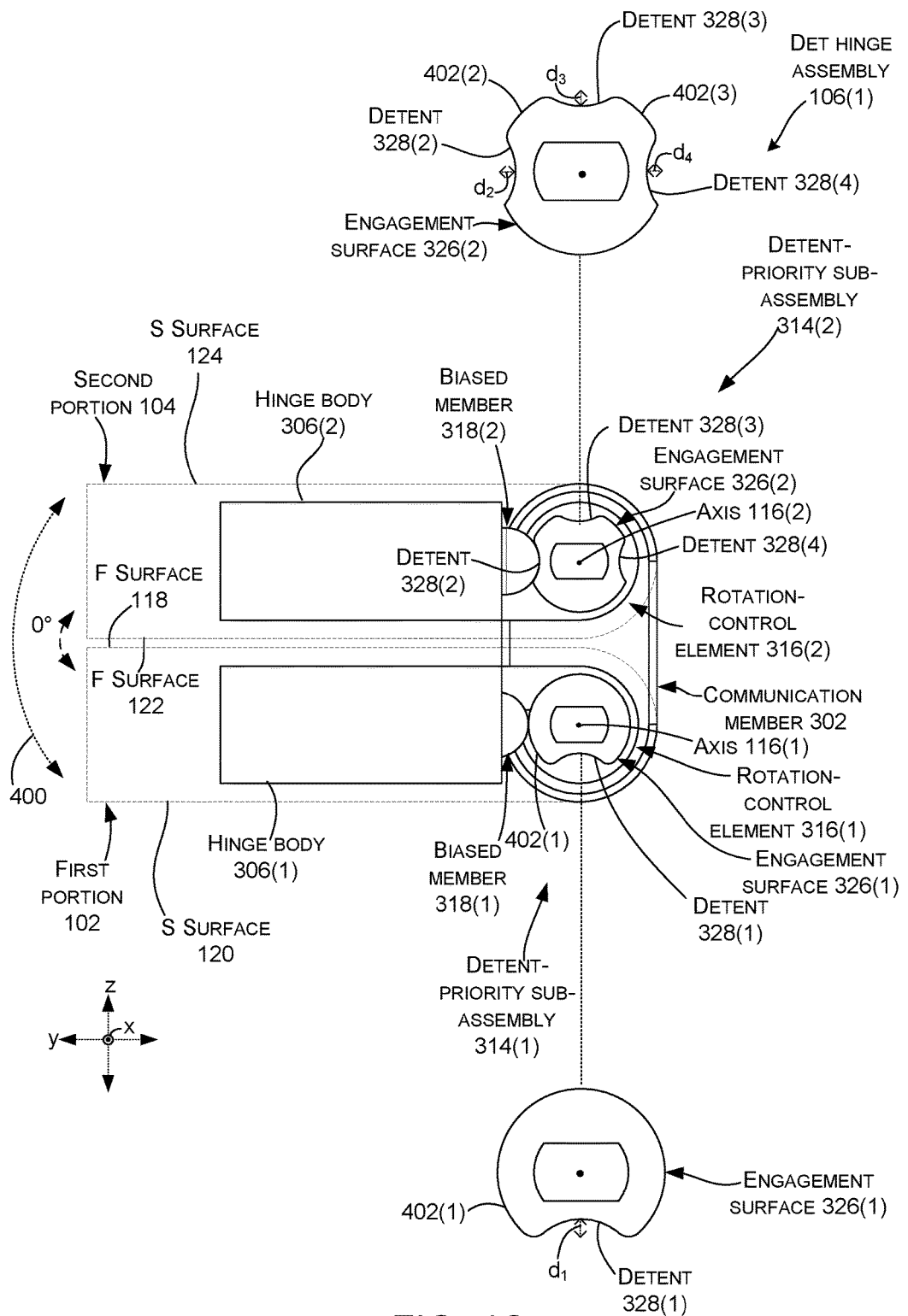

The 360-orientation of FIGS. 8A-8C is similar to the zero-degree orientation of FIGS. 4A-4C except that the second surfaces 120 and 124 are now facing inwardly and the first surfaces 118 and 122 are facing outwardly. The illustrated implementation has a collective range of rotation of 360 degrees (e.g., from the zero-degree orientation of FIGS. 4A-4C to the 360-degree orientation of FIGS. 8A-8C). The determinative hinge assembly can control a relative order that rotation occurs around each hinge axes and a sub-set of the rotation that occurs around each hinge axis.

FIG. 4A shows rotation limiters 330 in contact with the communication member 302 to define an endpoint of rotation around the hinge axes 116. Stated another way, rotation limiter 330(1) is blocking further rotation of hinge body 306(1) and hence first portion 102 around hinge axis 116(1) toward second portion 104. Similarly, rotation limiter 330(2) is blocking further rotation of hinge body 306(2) and hence second portion 104 around hinge axis 116(2) toward the first portion 102.

FIG. 4C shows enlarged views of engagement surfaces 326. The engagement surfaces can entail detents 328 and intervening smooth regions (e.g., convex regions) 402. In the illustrated implementation detent 328(1) on engagement surface 326(1) has a depth $d_1$, which is greater than the depths $d_2$-$d_4$ of detents 328(2), 328(3), and 328(4) on engagement surface 326(2). In this example, the depths of detents $d_2$-$d_4$ are approximately equal to one another, though they could have different depths. In this case, detents 328(2), 328(3), and 328(4) are spaced 90 degrees from one another, though other ranges could be employed.

Assume for purposes of explanation that starting in the closed position of FIGS. 4A-4C, the user wants to open the device 100 by exerting a force with his/her hands as represented by force arrow 400 (e.g., clockwise rotation around hinge axis 116(2) and counter-clockwise rotation around hinge axis 116(1). At this point, relative to detent-priority sub-assembly 314(2), biased member 318(2) is positioned in detent 328(2) of engagement surface 326(2). This relation creates a relatively high resistance to rotation for the second portion 104 around hinge axis 116(2). In contrast, relative to detent-priority sub-assembly 314(1), biased member 318(1) is positioned against a smooth region (e.g., non-detent portion) 402 of engagement surface 326(1). This relation creates relatively less resistance to rotation around hinge axis 116(1). As a result, counter-clockwise rotation will begin with first portion 102 rotating around hinge axis 116(1) while the second portion 104 remains stationary relative to hinge axis 116(2).

Figure 5A:
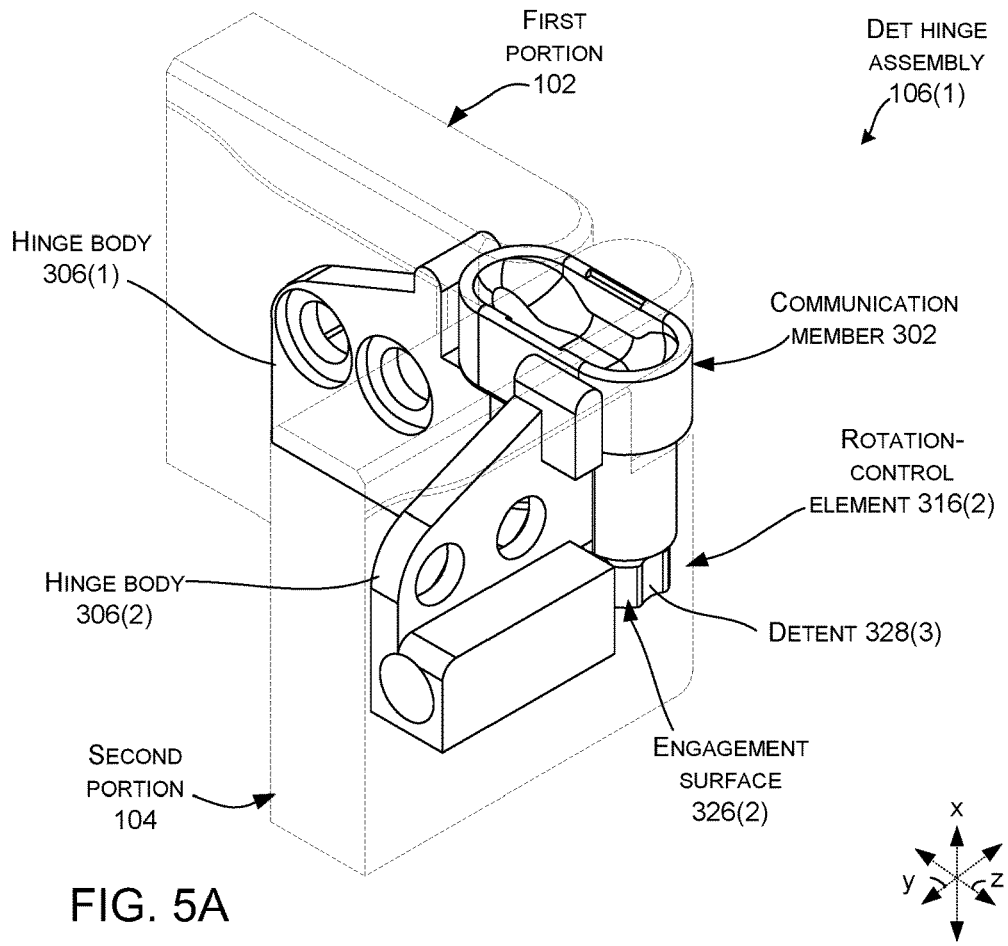
Figure 5B:
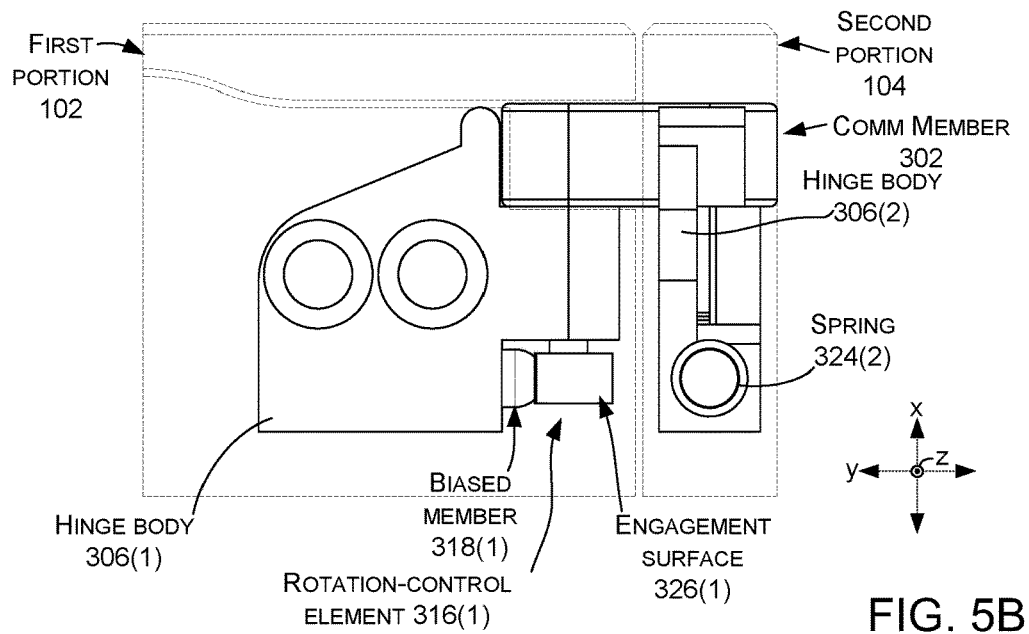
Figure 5C:
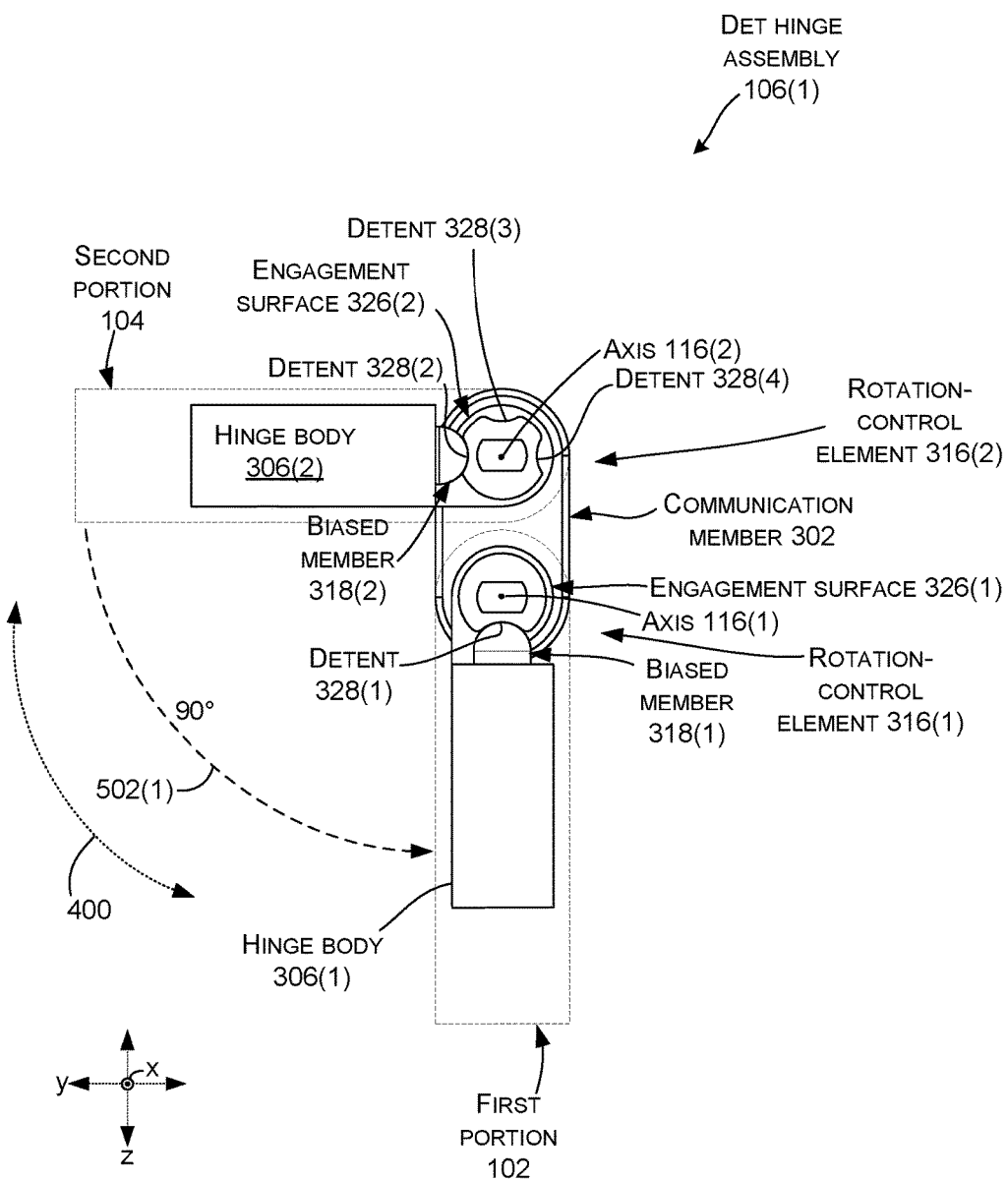

FIGS. 5A-5C show a first range of rotation (indicated partially complete) at 502(1) of first portion 102 around hinge axis 116(1). At this point, the range of rotation is 90 degrees relative to the zero-degree orientation of FIGS. 4A-4C and the rotation has occurred around first hinge axis 116(1). The biased member 318(1) is now engaging detent 328(1) rather than engaging smooth region 402(1). The position of the biased member 318(1) engaging the detent 328(1) provides resistance to further rotation (and also to reverse rotation). At this point, biased member 318(2) remains in detent 328(2). Thus, the first and second portions can readily maintain this orientation unless acted upon by the user. Assume for purposes of explanation that the user continues to apply the force represented by arrow 400. Recall from FIG. 4C, that detent 328(1) is deeper than detent 328(2). Thus, detent 328(1) provides relatively more resistance to rotation around hinge axis 116(1) than detent 328(2) does around hinge axis 116(2). For example, in one implementation the resistance to rotation around hinge axis 116(1) could be in a range from about 250-350 Newton-millimeters (N-mm) while the range of rotation around the second hinge axis 116(2) could be in a range of about 50-150 N-mm. Of course, these values are provided for purposes of explanation and other values are contemplated.

At this point, the force represented by arrow 400 will force biased member 318(2) out of detent 328(2) and clockwise rotation of the second portion 104 will start around hinge axis 116(2). Viewed from one perspective, in some implementations, the biased member 318 can be a male-shaped element which, when mechanically engaging a female-shaped detent 328, can provide a greater resistance to rotation than when the biased member engages other smooth regions 402 of the engagement surface 326.

FIGS. 6A-6C show the determinant hinge assembly 106(1) after a second range of rotation (indicated partially completed) at 602(1) around the second hinge axis 116(2). At this point the second range of rotation entails 90 degrees of rotation. This 90 degrees of rotation, combined with the earlier 90 degrees of rotation around hinge axis 116(1), results in the first and second portions 102 and 104 being oriented at 180 degrees from one another as indicated at 604(1). Thus, arrow 602(1) represents the rotation from FIGS. 5A-5C to 6A-6C and arrow 604(1) represents the total rotation from FIGS. 4A-4C to 6A-6C.

At this point, biased member 318(1) is engaging detent 328(1) and biased member 318(2) is engaging detent 328(3) so that the device is biased to maintain this 180-degree orientation. As mentioned above relative to FIG. 2C, the user may want to maintain this orientation in certain scenarios. At this point, assume that the user continues to exert the force represented by arrow 400 to continue rotation of the first and second portions.

FIGS. 7A-7C show a subsequent view of the determinant hinge assembly 106(1) where the second range of rotation around second hinge axis 116(2) continued from 90 degrees (FIGS. 6A-6C) to 180 degrees (now indicated as 602(2)). Stated another way, arrow 602(2) represents rotation around the second hinge axis (FIGS. 5A-5C to FIGS. 7A-7C) and arrow 604(2) represents total rotation of 270 degrees from the zero-degree orientation of FIGS. 4A-4C to the 270 degree orientation of FIGS. 7A-7C).

Rotation limiter 330(2) is now contacting communication member 302 (e.g., an opposite side of the communication member as in FIGS. 4A-4C). As such, the rotation limiter 330(2) can define the second range of rotation around the second hinge axis 116(2). In this case, the second range of rotation around the second hinge axis is 180 degrees. At this point, the collective or total rotation between the first and second portions 102 and 104 is now 270 degrees (initial 90 degrees around first hinge axis 116(1) and then 180 degrees around the second hinge axis 116(2)). To accomplish this latest rotation, the applied force 400 forced biased member 318(2) from detent 328(3) across smooth region 402(3) and into detent 328(4). Recall that detent 328(1) is deeper than detent 328(3) and as such offers more resistance to rotation than is experienced relative to second hinge axis 116(2). Assume that the user wants to open the device farther and continues to apply force 400.

FIGS. 8A-8C show a subsequent view of the determinant hinge assembly 106(1) where first portion 102 rotated another 90 degrees around hinge axis 116(1) as indicated by arrow 502(2). Arrow 604(3) shows the total rotation from FIGS. 4A-4C to FIGS. 8A-8C. To accomplish this latest rotation, the force 400 (FIG. 7C) forced biased member 318(1) out of detent 328(1) and moved the hinge body 306(1) counter-clockwise around hinge axis 116(1). Recall that the force reached this level because further rotation around hinge axis 116(2) is blocked by rotation limiter 330(2) and so rotation occurred around hinge axis 116(1). As a result of the illustrated rotation around hinge axis 116(1), the first range of rotation of first hinge axis 116(1) expanded from 90 degrees (FIGS. 4A-4C to 5A-5C) to 180 degrees (e.g., FIGS. 7A-7C to FIGS. 8A-8C). Stated another way, the rotation around the first hinge axis 116(1) entails 90 degrees of 502(1) in FIG. 5C plus 90 degrees of FIG. 502(2) of FIG. 8C. The collective or total rotation between the first and second portions 102 and 104 is now 360 degrees (initial 90 degrees around first hinge axis 116(1) (e.g., 502(1), then 180 degrees around the second hinge axis 116(2) (e.g., 602(1), 602(2)), followed by 90 degrees more around the first hinge axis 116(1) (e.g., 502(2) (e.g., total range of rotation is 360 degrees)). To accomplish this latest rotation, the applied force 400 forced biased member 318(1) from detent 328(1) across smooth region 402(1) until rotation limiter 330(1) contacted communication member 302. Rotation is now complete around both hinge axes.

The user can reverse the process by once again forcing the first and second portions 102 and 104 apart from one another. In such a scenario, starting at the 360-degree orientation of FIGS. 8A-8C, the user can apply the force to create clockwise rotation around hinge axis 116(1) and counter-clockwise rotation around hinge axis 116(2). At this point, there is less resistance to rotation around hinge axis 116(1) than around hinge axis 116(2) (e.g., biased member 318(1) is engaging smooth region 402(1) whereas biased member 318(2) is engaging detent 328(4)). As such, rotation starts with the first portion rather than the second portion for the first 90 degrees to return to the orientation of FIGS. 7A-7C. Once biased member 318(1) engages detent 328(1), it offers greater resistance to rotation than biased member 318(2) in detent 328(4) and so rotation switches to the second hinge axis 116(2) for 180 degrees (e.g., FIGS. 6A-6C and then 5A-5C) and then finishes with 90 degrees of rotation around first hinge axis 116(1) to return to the zero-degree orientation of FIGS. 4A-4C.

Thus, from one perspective, the detent-priority sub-assembly 314(1) can employ different detent sizes (with equivalent springs) to urge the smaller detent to let go before the larger detent, thus determining an active hinge axis. The implementation illustrated in FIGS. 4A-8C involves a two axis 360-degree hinge. Each hinge axis 116 can rotate 180 degrees. The detents 328 can be arranged in such a manner that the first hinge axis rotates 90 degrees (e.g., zero to 90 degrees), the second hinge axis rotates an additional 180 degrees (e.g., 91 to 270 degrees), and finally the first hinge axis rotates another 90 degrees (e.g., 271 to 360 degrees) to complete 360 degrees of rotation. It can be advantageous for the first hinge axis 116(1) to rotate only 90 degrees so that the device can lay flat when the first and second portions 102 and 104 have rotated 180 degrees with respect to each other. Toward this end, the first hinge axis can have a relatively large (e.g., deep) detent 328(1) that is positioned 90 degrees from the closed state, while the second hinge axis 116(2) can have a relatively small (e.g., shallow) detent at 0, 90 and 180 degrees.

Initially, the first hinge axis, not being in a detent, can have a rotational degree of freedom while the second hinge axis, already being in a small detent, will not. Once the first hinge axis rotates 90 degrees, the biased member 318 tied to the first hinge axis will engage the large detent 328(1) and then the small detent 328(2) on the second hinge axis 116(2) can break free first, allowing the second hinge axis to rotate. The second hinge axis can either rotate 90 degrees and engage a small detent or rotate 180 degrees and reach the end of its rotation. The second hinge axis having reached the end of its rotation can result in additional torque overcoming the first large detent so that the first hinge axis can rotate an additional 90 degrees so that the hinge completes 360 degrees of rotation. The whole process can be reversed when the hinge is articulated in the opposite direction. Further, different resistances associated with detents of the first hinge axis relative to detents of the second hinge axis can be achieved in other ways, such as different spring forces, different overall detent sizes, different engagement surface frictions, etc.

The illustrated implementation employs 90-degree rotations around individual hinge axes 116. However, other implementations can employ other values. For instance, rotation could start around the first hinge axis 116(1) until a relatively deep detent 328(1) is engaged by biased member 318(1). Rotation around the second hinge axis 116(2) could commence between four relatively shallow detents spaced 60 degrees apart (e.g., 180 degrees of rotation), followed by another 120 degrees of rotation around the first hinge axis 116(1) when biased member 318(1) is forced from detent 328(1).

The present solutions can also offer fault tolerance advantages. For instance, suppose that in a use case scenario a fault occurs in the operation of the detent-priority sub-assembly 314(1), such as both biased elements are bumped out or their respective detents and simultaneous rotation occurs around both hinge axes 116. In such a case, when rotation is completed in either direction until the rotation limiters 330 contact the communication member 302, the detent-priority sub-assembly can automatically reset (e.g., biased member 318(2) can automatically re-engage detent 328(2) (zero-degree orientation) or detent 328(4) (360-degree orientation)) and normal function returns. Thus, the fault can be automatically restored.

Individual elements of the determinative hinge assembly 106 can be made from various materials, such as metals, plastics, and/or composites. These materials can be prepared in various ways, such as in the form of sheet metals, die cast metals, machined metals, 3D printed materials, molded or 3D printed plastics, and/or molded or 3D printed composites, among others, or any combination of these materials and/or preparations can be employed.

The present determinative hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for determinative hinge assemblies and devices are contemplated beyond those shown above relative to FIGS. 1-8C.

Although techniques, methods, devices, systems, etc., pertaining to determinative hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various examples are described above. Additional examples are described below. One example includes a device comprising a first portion and a second portion and a determinative hinge assembly rotatably securing hinge ends of the first and second portions for a first range of rotation around a first hinge axis associated with the first portion and a second range of rotation around a second hinge axis associated with the second portion. The hinge assembly comprises a detent-priority sub-assembly that controls an order of rotation around the first and second hinge axes. The detent-priority sub-assembly comprises a first biased member that engages a first rotation-control element that includes a first detent having a first depth, and further comprises a second biased member that engages a second rotation-control element having a second detent having a second depth that is different than the first depth such that with the first and second portions positioned against one another and rotated away from one another, rotation starts around the first hinge axis until the first rotation-control element engages the first detent. Then the second range of rotation is completed around the second hinge axis before rotation returns to the first hinge axis to complete the first range of rotation.

Another example can include any of the above and/or below examples where the second detent comprises second, third, and fourth detents that are spaced 90 degrees apart from one another.

Another example can include any of the above and/or below examples where rotation starts around the first hinge axis and continues for 90 degrees until the first biased member engages the first detent.

Another example can include any of the above and/or below examples where the second biased member is engaging the second detent for the 90 degrees of rotation starting with the first and second portions positioned against one another.

Another example can include any of the above and/or below examples where rotation from 91 degrees to 270 degrees occurs around the second hinge axis where the second biased member is rotated out of the second detent, into the third detent, out of the third detent and into the fourth detent while the first biased member stays in the first detent.

Another example can include any of the above and/or below examples where at 271 degrees the first biasing element is forced out of the first detent and rotation from 271 degrees to 360 degrees occurs around the first hinge axis.

Another example can include any of the above and/or below examples where the first detent is deeper than the second detent.

Another example can include any of the above and/or below examples where the first biased member is biased with a same force as the second biased member or wherein the first biased member is biased with a greater force than the second biased member.

Another example can include any of the above and/or below examples where the second detent comprises second, third, and fourth detents, and wherein the second, third, and fourth detents are of equal depths to one another and shallower than the first detent.

Another example can include any of the above and/or below examples where the first biased member comprises a ball shape.

Another example can include any of the above and/or below examples where the first biased member comprises a roller-shaped follower.

Another example can include any of the above and/or below examples where the first biased member comprises a male shaped element and the first detent comprises a female shaped element.

Another example can include any of the above and/or below examples where the first biased member is biased toward the first rotation-control element by a compression spring.

Another example can include any of the above and/or below examples where the determinative hinge assembly further comprises a communication member that includes a first hinge pin that lies along the first hinge axis and a second hinge pin that lies along the second hinge axis.

Another example can include any of the above and/or below examples where the first hinge pin includes the first rotation-control element and wherein the second hinge pin includes the second rotation-control element.

Another example can include any of the above and/or below examples where the first rotation-control element is attached to the first hinge pin and wherein the second rotation-control element is attached to the second hinge pin.

Another example can include a device comprising a first portion and a second portion and a determinative hinge assembly rotatably securing hinge ends of the first and second portions around a first hinge axis associated with the first portion and a second hinge axis associated with the second portion. The hinge assembly comprises a detent-priority sub-assembly that controls an order of rotation around the first and second hinge axes with a first detent associated with the first hinge axis that has a different depth than a second detent associated with the second hinge axis.

Another example can include any of the above and/or below examples where the first detent is deeper than the second detent.

Another example can include any of the above and/or below examples where the first detent offers more resistance to rotation than the second detent.

Another example can include a device comprising a first portion and a second portion and a determinative hinge assembly rotatably securing hinge ends of the first and second portions for a first range of rotation around a first hinge axis associated with the first portion and a second range of rotation around a second hinge axis associated with the second portion. The hinge assembly comprises a detent-priority sub-assembly that controls an order of rotation around the first and second hinge axes with a first biased member that engages a first rotation-control element that includes a first biased member that engages a first detent and second rotation-control element that includes a second biased member that engages a second detent, where the first biased member and the first detent provide more resistance to rotation than the second biased member and the second detent.

Another example can include any of the above and/or below examples where the second detent comprises second, third, and fourth detents that are spaced 90 degrees apart.

Another example can include any of the above and/or below examples where a first range of rotation around the first hinge axis comprises 180 degrees and a second range of rotation around the second hinge axis comprises 180 degrees and a total range of rotation of the first and second portions comprises 360 degrees.

Another example can include any of the above and/or below examples where the device further comprises, starting at a zero-degree orientation with the first and second portions against one another, the second biased member is in the second detent and rotation occurs for 90 degrees around the first hinge axis until the first biased member engages the first detent and then rotation occurs around the second hinge axis for 180 degrees and then rotation occurs around the first hinge axis for 90 more degrees.

Another example can include any of the above and/or below examples where rotation starts around the first hinge axis and completes a portion of the first range of rotation and then rotation switches to the second hinge axis and completes the second range of rotation before switching back to the first hinge axis and completing a remainder of the first range of rotation.

Another example can include any of the above and/or below examples where the determinative hinge assembly provides fault tolerance such that in an instance where the first biased element is forced out of the first detent while the second biased element is not in any of the second, third, or fourth detents, resetting of the first and second biased elements automatically occurs when the first and second portions are rotated to zero degrees or 360 degrees.

The invention claimed is:

1. A device, comprising:
   a first portion and a second portion; and,
   a determinative hinge assembly rotatably securing hinge ends of the first and second portions for a first range of rotation around a first hinge axis defined by a first hinge pin and a second range of rotation around a second hinge axis defined by a second hinge pin, the determinative hinge assembly comprising:
   a first biased member extending from the first portion that is engageable with a first detent of a first rotation-control element disposed on the first hinge axis, the first detent having a first depth, and,
   a second biased member extending from the second portion that is engageable with a second detent of a second rotation-control element disposed on the second hinge axis, the second detent having a second depth that is different than the first depth, such that in an instance where the first and second portions are positioned against one another and rotated away from one another, the first range of rotation starts around the first hinge axis until the first biased member engages the first detent halting the first range of rotation around the first hinge axis, and then the second range of rotation is completed around the second hinge axis before rotation returns to the first hinge axis to complete the first range of rotation.

2. The device of claim 1, wherein the second detent comprises second, third and fourth detents that are spaced 90 degrees apart from one another.

3. The device of claim 2, wherein in the instance where the first and second portions are positioned against one another and rotated away from one another, the first range of rotation starts around the first hinge axis and continues for 90 degrees of rotation until the first biased member engages the first detent.

4. The device of claim 3, wherein in the instance, the second biased member engages the second detent for the 90 degrees of rotation.

5. The device of claim 4, wherein rotation of the first portion relative to the second portion from 91 degrees to 270 degrees occurs around the second hinge axis where the second biased member is rotated out of the second detent, into the third detent, out of the third detent and into the fourth detent while the first biased member stays in the first detent.

6. The device of claim 5, wherein at 271 degrees rotation of the first portion relative to the second portion, the first biased member is forced out of the first detent and rotation of the first portion relative to the second portion from 271 degrees to 360 degrees occurs around the first hinge axis.

7. The device of claim 1, wherein the first detent is deeper than the second detent.

8. The device of claim 1, wherein the second detent comprises second, third, and fourth detents, and wherein the second, third, and fourth detents are of equal depths to one another and shallower than the first detent.

9. The device of claim 1, wherein the first biased member comprises a ball shape.

10. The device of claim 1, wherein the first biased member comprises a roller-shaped follower.

11. The device of claim 1, wherein the first biased member comprises a male shaped element and the first detent comprises a female shaped element.

12. The device of claim 1, wherein the first biased member is biased toward the first rotation-control element by a compression spring.

13. The device of claim 1, wherein the determinative hinge assembly further comprises a communication member that includes the first hinge pin and the second hinge pin.

14. The device of claim 13, wherein the first hinge pin includes the first rotation-control element and wherein the second hinge pin includes the second rotation-control element.

15. The device of claim 13, wherein the first rotation-control element is attached to the first hinge pin and wherein the second rotation-control element is attached to the second hinge pin.

16. A device, comprising:

a first portion and a second portion; and, a determinative hinge assembly rotatably securing hinge ends of the first and second portions, the determinative hinge assembly comprising:

a first rotation-control element that defines a first hinge axis and includes a first detent that is engageable with a first biased member of the first portion, and a second rotation-control element that defines a second hinge axis and includes a second detent that is engageable with a second biased member of the second portion, a difference in depth between the first detent and the second detent controlling an order of rotation of the first and second portions around the first and second hinge axes by controlling an order of disengagement of the first biased member with the first detent and the second biased member of the second detent.

17. The device of claim 16, wherein the first detent is deeper than the second detent.

18. The device of claim 16, wherein the first detent offers more resistance to rotation than the second detent.

19. A device, comprising:

a first portion and a second portion; and, a determinative hinge assembly rotatably securing hinge ends of the first and second portions for a first range of rotation around a first hinge axis defined by a first rotation-control element of the determinative hinge assembly and a second range of rotation around a second hinge axis defined by a second rotation-control element of the determinative hinge assembly, the determinative hinge assembly comprising a first biased member extending from the first portion that is engageable with a first detent of the first rotation-control element and a second biased member extending from the second portion that is engageable with a second detent of the second rotation-control element, engagement of the first detent by the first biasing member providing a first resistance to rotation that is relatively higher than a second resistance to rotation provided by engagement of the second detent by the second biasing member, a difference in the first and second resistances to rotation controlling an order of rotation around the first and second hinge axes.

20. The device of claim 19, wherein the second detent comprises second, third, and fourth detents that are spaced 90 degrees apart.

* * * * *